United States Patent
Hamada

(10) Patent No.: US 8,368,813 B2
(45) Date of Patent: Feb. 5, 2013

(54) GENERATING DEVICE, GENERATING METHOD, AND PROGRAM FOR REPRODUCING SUBTITLES FROM A FILE IN WHICH SUBTITLE DATA RELATING TO SUBTITLES IS STORED

(75) Inventor: Toshiya Hamada, Saitama (JP)

(73) Assignee: Sony Corporation, Tokyo (JP)

( * ) Notice: Subject to any disclaimer, the term of this patent is extended or adjusted under 35 U.S.C. 154(b) by 930 days.

(21) Appl. No.: 12/470,157

(22) Filed: May 21, 2009

(65) Prior Publication Data
US 2009/0303382 A1   Dec. 10, 2009

(30) Foreign Application Priority Data

Jun. 10, 2008  (JP) .................................. 2008-151695

(51) Int. Cl.
- *H04N 9/74*  (2006.01)
- *H04N 7/12*  (2006.01)
- *H04N 7/00*  (2011.01)

(52) U.S. Cl. .... 348/589; 386/337; 386/355; 375/240.26

(58) Field of Classification Search .................. 348/468, 348/589, 564, 600, 722, 512, 515; 375/240.26; 715/716, 723; 704/201, 229, 235, 270; 725/116, 725/137, 146; 707/736, 754; 709/234, 235; 386/245, 337, 355, 356
See application file for complete search history.

(56) References Cited

U.S. PATENT DOCUMENTS

| | | | |
|---|---|---|---|
| 5,999,225 A * | 12/1999 | Yagasaki et al. | 348/564 |
| 6,204,883 B1 * | 3/2001 | Tsukagoshi | 348/468 |
| 6,233,253 B1 * | 5/2001 | Settle et al. | 370/474 |
| 7,369,180 B2 * | 5/2008 | Xing | 348/569 |
| 2004/0168203 A1 * | 8/2004 | Seo et al. | 725/135 |
| 2005/0191035 A1 * | 9/2005 | Jung et al. | 386/95 |
| 2005/0207736 A1 * | 9/2005 | Seo et al. | 386/95 |
| 2005/0276580 A1 * | 12/2005 | Zacek | 386/131 |
| 2006/0127051 A1 * | 6/2006 | Tsumagari et al. | 386/95 |

OTHER PUBLICATIONS

ISO/IEC 14496-12:2005(E) Part 12:ISO base media file format (abstract only).
ISO/IEC 14496-14:2003(E) Part 14:MP4 file format (abstract only).

\* cited by examiner

*Primary Examiner* — Victor Kostak
(74) *Attorney, Agent, or Firm* — Oblon, Spivak, McClelland, Maier & Neustadt, L.L.P.

(57) ABSTRACT

A generating device includes: a subtitle encode unit for generating subtitle data by encoding the image data of a subtitle; and a determining unit for determining whether or not reproduction of the subtitle is in time for display thereof based on the size of encoded data obtained by encoding the image data, with the subtitle data being classified into display sets as display units, and with the determining unit obtaining processing time regarding the display set of interest from the size of encoded data of the display set of interest according size-time relationship between the size of the encoded data and the processing time, and determining that reproduction of the subtitle of the display set of interest is not in time for display thereof when the available time regarding the display set of interest is below the processing time regarding the display set of interest, to output error information.

10 Claims, 22 Drawing Sheets

FIG. 2A

| Sample count | Sample duration |
|---|---|
| 4 | 3 |
| 2 | 1 |
| 3 | 2 |

FIG. 2B

| Sample | size [bytes] |
|---|---|
| 1 | size 1 |
| 2 | size 2 |
| 3 | size 3 |
| 4 | size 4 |
| 5 | size 5 |
| 6 | size 6 |
| 7 | size 7 |
| 8 | size 8 |
| 9 | size 9 |

FIG. 2C

| First chunk | Samples-per-chunk | Sample description ID |
|---|---|---|
| 1 | 3 | 23 |
| 3 | 1 | 23 |
| 5 | 1 | 24 |

FIG. 2D

| Chunk | Offset [bytes] |
|---|---|
| 1 | offset 1 |
| 2 | offset 2 |
| 3 | offset 3 |
| 4 | offset 4 |
| 5 | offset 5 |

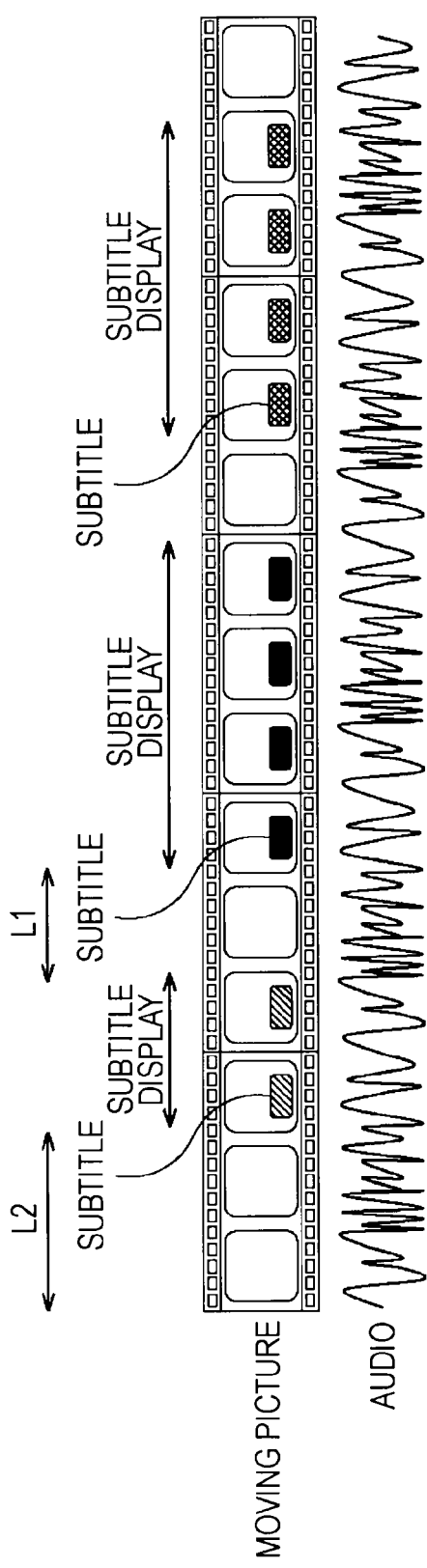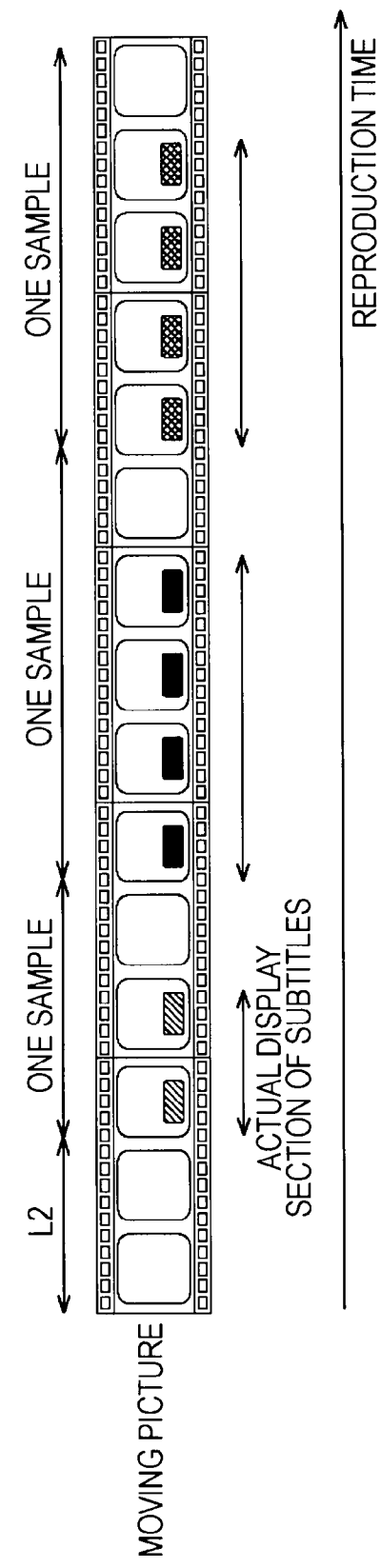

FIG. 9

PAGE COMPOSITION SEGMENT (PCS)

| Syntax | No. of bits | Mnemonics |
|---|---|---|
| page_composition_segment() { | | |
|   segment_type | 8 | bslbf |
|   segment_length | 16 | uimsbf |
|   video_horizontal_size | 16 | uimsbf |
|   video_vertical_size | 16 | uimsbf |
|   video_frame_rate | 4 | bslbf |
|   reserved | 4 | bslbf |
|   page_version_number | 16 | uimsbf |
|   page_state | 2 | bslbf |
|   reserved | 14 | bslbf |
|   ref_to_CLUT_id | 8 | uimsbf |
|   number_of_region_composition_objects | 8 | uimsbf |
|   for(i=0;i<number_of_region_composition_objects;i++) { | | |
|     region_composition_object() { | | |
|       ref_to_object_id | 16 | uimsbf |
|       ref_to_region_id | 8 | uimsbf |
|       reserved | 8 | bslbf |
|       object_horizontal_position | 16 | uimsbf |
|       object_vertical_position | 16 | uimsbf |
|     } | | |
|   } | | |
| } | | |

FIG. 10

| VALUE OF page_state | TYPE OF DISPLAY SET | EXPLANATION |
|---|---|---|
| 00b | reserved | |
| 01b | Display Change Point | THIS DISPLAY SET INCLUDES WHOLE INFORMATION FOR SUBTITLE DISPLAY. |
| 10b | Display Period Start | REPRESENTS START OF A NEW EPOCH. THIS DISPLAY SET INCLUDES WHOLE INFORMATION FOR SUBTITLE DISPLAY. |
| 11b | reserved | |

FIG. 11

REGION DEFINITION SEGMENT (RDS)

| Syntax | No. of bits | Mnemonics |
|---|---|---|
| region_definition_segment () { | | |
| segment_type | 8 | bslbf |
| segment_length | 16 | uimsbf |
| number_of_regions | 8 | uimsbf |
| for (i=0;i<number_of_regions;i++) { | | |
| region() { | | |
| region_id | 8 | uimsbf |
| region_horizontal_position | 16 | uimsbf |
| region_vertical_position | 16 | uimsbf |
| region_width | 16 | uimsbf |
| region_height | 16 | uimsbf |
| } | | |
| } | | |
| } | | |

FIG. 13

CLUT DEFINITION SEGMENT (CDS)

| Syntax | No. of bits | Mnemonics |
|---|---|---|
| CLUT_definition_segment() { | | |
|   segment_type | 8 | bslbf |
|   segment_length | 16 | uimsbf |
|   CLUT_id | 8 | uimsbf |
|   CLUT_version_number | 8 | uimsbf |
|   while(processed_length<segment_length) { | | |
|     CLUT_entry() { | | |
|       CLUT_entry_id | 8 | uimsbf |
|       Y-value | 8 | uimsbf |
|       Cr-value | 8 | uimsbf |
|       Cb-value | 8 | uimsbf |
|       T-value | 8 | uimsbf |
|     } | | |
|   } | | |
| } | | |

FIG. 14

OBJECT DATA DEFINITION SEGMENT (ODS)

| Syntax | No. of bits | Mnemonics |
|---|---|---|
| object_data_definition_segment () { | | |
|   segment_type | 8 | bslbf |
|   segment_length | 16 | uimsbf |
|   object_id | 16 | uimsbf |
|   object_version_number | 8 | uimsbf |
|   reserved | 8 | bslbf |
|   object_data () { | | |
|     object_length | 24 | uimsbf |
|     object_horizontal_size | 16 | uimsbf |
|     object_vertical_size | 16 | uimsbf |
|     while (processed_length<object_length) { | | |
|       encoded_data_string () | | |
|     } | | |
|   } | | |
| } | | |

FIG. 15

END OF DISPLAY SET SEGMENT (END)

| Syntax | No. of bits | Mnemonics |
|---|---|---|
| end_of_display_set_segment(){ | | |
|    segment_type | 8 | bslbf |
|    segment_length | 16 | uimsbf |
| } | | |

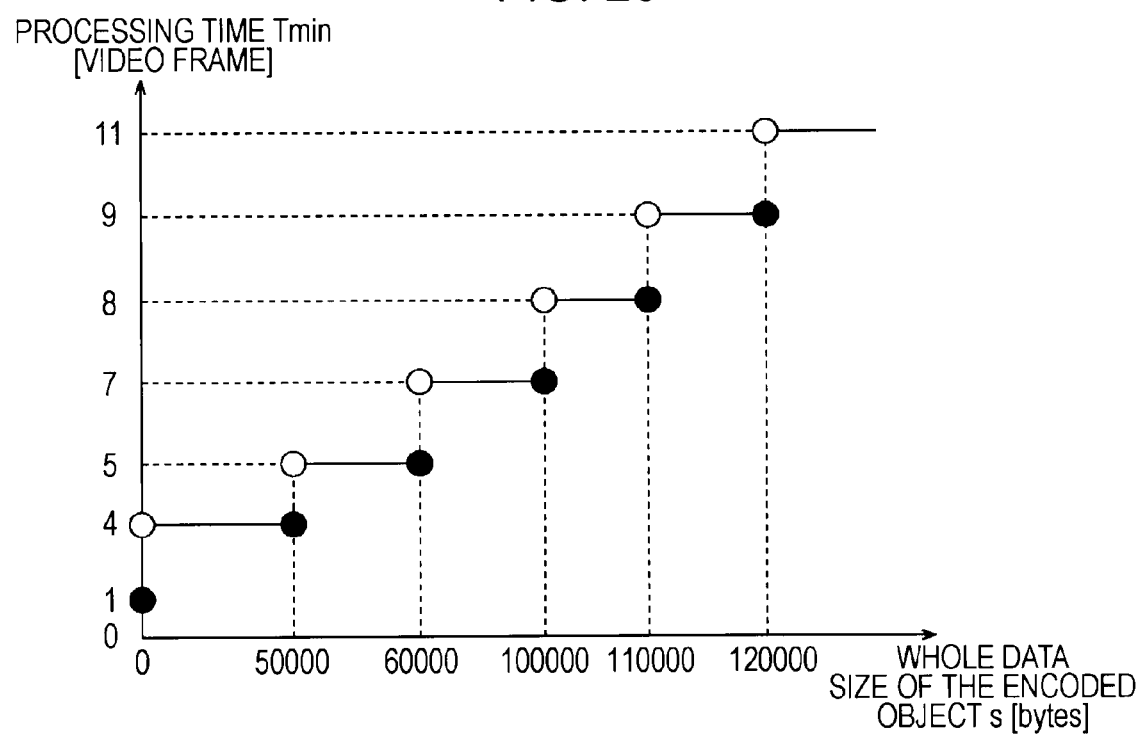

GENERATING DEVICE, GENERATING METHOD, AND PROGRAM FOR REPRODUCING SUBTITLES FROM A FILE IN WHICH SUBTITLE DATA RELATING TO SUBTITLES IS STORED

BACKGROUND OF THE INVENTION

1. Field of the Invention

The present invention relates to a generating device, generating method, and program, and specifically, relates to a generating device, generating method, and program, which allow reproduction of subtitles from a file in which subtitle data relating to subtitles is stored, having a format conforming to, for example, the MP4 file format or ISO base media file format or the like to be in time for the display of the subtitles thereof.

2. Description of the Related Art

As for the format of the file, for example, the ISO base media file format (ISO/IEC (International Organization for Standardization/International Engineering Consortium)) 144996-12: Part 12) is available (e.g., see ISO/IEC 14496-12: 2005(E) Part 12: ISO base media file format).

Also, as for a format derived from the ISO/IEC 14496-12: Part 12, the MP4 file format (ISO/IEC 14496-14: Part 14) is available (e.g., see ISO/IEC 14496-14: 2003(E) Part 14: MP4 file format).

With the management method of the ISO base media file format, and MP4 file format, the display time in display units (access units) is identical to the time from the display start time in display units to the display start time in the next display units, e.g., compatibility as to moving picture data is high. For example, with regard to moving picture data, one frame or one GOP (Group Of Picture) is taken as display units, and the display edge thereof can be stored in a file of the ISO base media file format as one sample of the ISO base media file format (in correlated with one sample).

Now, of the ISO base media file format, and MP4 file format, for example, the ISO base media file format will be described below. However, the following description is also true for the MP4 file format.

SUMMARY OF THE INVENTION

Incidentally, in recent years, there has been a trend in distribution of data toward distribution of moving picture contents and audio contents, by way of arrangements for distributing data, such as the Internet and LANs (Local Area Networks).

With regard to moving picture contents, there has been demand for subtitles being displayed by being superimposed on a moving picture. However, in a case where subtitle data is stored in a file conforming to the ISO base media file format in which so-called media data such as moving picture data, audio data, and so forth are stored, reproduction of a subtitle may not be in time for display of the subtitle thereof in some cases.

Specifically, with the ISO base media file format, the display (output) start time when starting display (output) of data can be managed with metadata, but not the decode time for reproduction of data, nor the decode start time when starting reproduction of data. Therefore, in a case where subtitle data is stored in a file conforming to the ISO base media file format, reproduction of a subtitle may not be in time for display of the subtitle thereof in some cases.

It has been realized that, in a case where subtitle data is stored in a file conforming to the ISO base media file format or the like, it is desirable for reproduction of a subtitle from the file thereof to be in time for display of the subtitle thereof.

A generating device, or program which causes a computer to function as a generating device, according to an embodiment of the present invention, includes: a subtitle encode unit configured to generate, of a stream including moving picture data relating to a moving picture, and subtitle data relating to a subtitle displayed over the whole display section of the moving picture, the subtitle data by encoding the image data of the subtitle; and a determining unit configured to determine whether or not reproduction of the subtitle is in time for display of the subtitle based on the size of the encoded data obtained by encoding the image data of the subtitle, with of a section where display of the subtitle is constant as the display units of the subtitle, the subtitle data being classified into a display set which is the subtitle data in the display units, and with in a case where the time between display start time when display of a subtitle to be displayed immediately before the subtitle of a display set of interest which is a display set to which attention is paid, and the display start time of the subtitle of the display set of interest is taken as available time which can be employed for reproduction of the display set of interest, and also the time used for reproduction of the display set of interest is taken as processing time, the determining unit obtaining processing time regarding the display set of interest from the size of the encoded data of the display set of interest in accordance with size-time relationship which is relationship obtained beforehand between the size of the encoded data and the processing time, and determining that reproduction of the subtitle of the display set of interest is not in time for display of the subtitle thereof when the available time regarding the display set of interest is below the processing time regarding the display set of interest, to output error information representing an error.

A generating method according to an embodiment of the present invention is a generating method including a step of: a generating device, configured to generate a stream including moving picture data relating to a moving picture, and subtitle data relating to a subtitle to be displayed over the whole display section of the moving picture, generating the subtitle data by encoding the image data of the subtitle, and determining whether or not reproduction of the subtitle is in time for the display of the subtitle based on the size of encoded data obtained by encoding the image data of the subtitle, with of a section where display of the subtitle is constant as the display units of the subtitle, the subtitle data being classified into a display set which is the subtitle data in the display units, with in a case where the time between display start time when display of a subtitle to be displayed immediately before the subtitle of a display set of interest which is a display set to which attention is paid, and the display start time of the subtitle of the display set of interest is taken as available time which can be employed for reproduction of the display set of interest, and also the time used for reproduction of the display set of interest is taken as processing time, the processing time regarding the display set of interest being obtained from the size of the encoded data of the display set of interest in accordance with size-time relationship which is relationship obtained beforehand between the size of the encoded data and the processing time, determination being made that reproduction of the subtitle of the display set of interest is not in time for display of the subtitle thereof when the available time regarding the display set of interest is below the processing time regarding the display set of interest, and error information representing an error being output.

According to the above configurations, with a section where display of the subtitle is constant as the display units of the subtitle, the subtitle data is classified into a display set which is the subtitle data in the display units. Also, in a case where the time between display start time when display of a subtitle to be displayed immediately before the subtitle of a display set of interest which is a display set to which attention is paid, and the display start time of the subtitle of the display set of interest is taken as available time which can be employed for reproduction of the display set of interest, and also the time used for reproduction of the display set of interest is taken as processing time, the processing time regarding the display set of interest is obtained from the size of the encoded data of the display set of interest in accordance with size-time relationship which is relationship obtained beforehand between the size of the encoded data and the processing time. Subsequently, determination is made that reproduction of the subtitle of the display set of interest is not in time for display of the subtitle thereof when the available time regarding the display set of interest is below the processing time regarding the display set of interest, and error information representing an error is output.

The generating device may be an independent device, or may be an internal block making up one device. Also, the program can be provided by being transmitted through a transmission medium, or by being recorded in a recording medium.

According to the above configurations, reproduction of subtitles can be performed in time for display of the subtitles thereof.

BRIEF DESCRIPTION OF THE DRAWINGS

FIGS. 2A through 2D are diagrams illustrating overview of the atom of the ISO base media file format;

FIGS. 3A and 3B are diagrams describing display of subtitles;

FIG. 9 is a diagram illustrating an example of the syntax of a PCS (Page Composition Segment);

FIG. 10 is a diagram describing the value of page_state in the PCS;

FIG. 11 is a diagram illustrating an example of the syntax of a RDS (region definition segment);

FIG. 13 is a diagram illustrating an example of the syntax of a CDS (CLUT definition segment);

FIG. 14 is a diagram illustrating an example of the syntax of an ODS (object data definition segment);

FIG. 15 is a diagram illustrating an example of the syntax of an END (end of display set segment);

FIG. 20 is a diagram illustrating size-time relationship;

DESCRIPTION OF THE PREFERRED EMBODIMENTS

Figure 1:
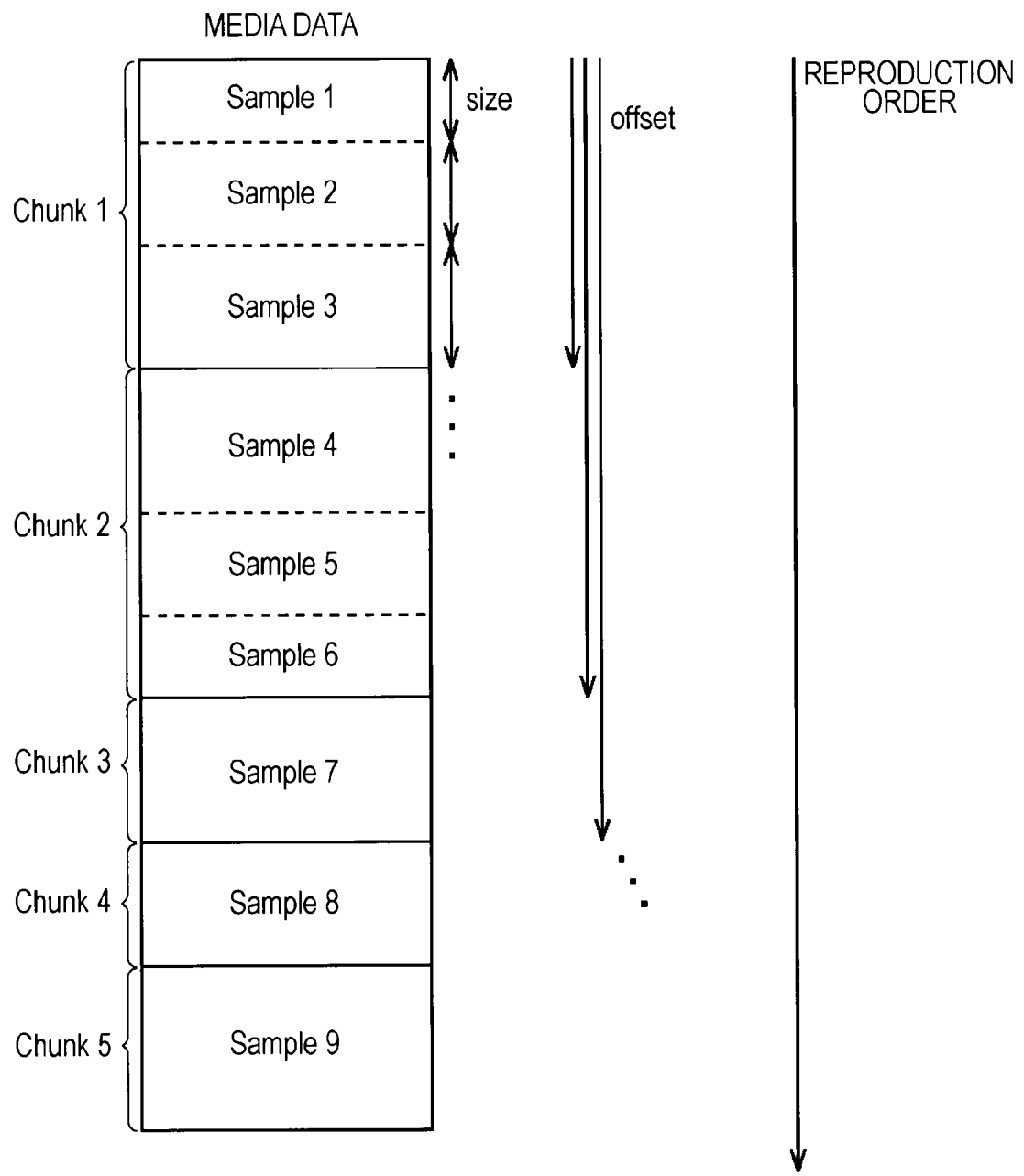
FIG. 1 is a diagram illustrating an example of media data stored in a file conforming to the ISO base media file format.

Embodiments of the present invention will be described below, following a brief preparatory description of the ISO base media file format. FIG. 1 illustrates an example of media data to be stored in a file conforming to the ISO base media file format. In FIG. 1, media data is classified into nine samples of Sample #1 through Sample #9.

Here, one sample is a display (output) unit for displaying (outputting) media data. In a case where media data is moving picture data, for example, one frame, or one GOP (Group Of Pictures) which is a MPEG (Moving Picture Experts Group)-2 video specification, or the like, corresponds to one sample. Also, in a case where media data is audio data, for example, one audio frame or the like determined by the specification of the audio data thereof corresponds to one sample.

Samples are arrayed densely on the temporal axis with no gap, i.e., arrayed densely in the reproduction time order, and are reproduced sequentially at the time of reproduction. With the ISO base media file format, a chunk is configured of one or more samples. Chunks are groups of one or more consecutive samples having the same property. With regard to moving picture data, for example, consecutive samples having the same frame rate or the like are taken as one chunk. Also, with regard to audio data, consecutive samples having the same sampling frequency or quantization step or the like are taken as one chunk.

In FIG. 1, the samples Sample #1 through Sample #3 which are three samples from the top make up one chunk Chunk #1, the subsequent three samples Sample #4 through Sample #6 make up one chunk Chunk #2, the subsequent one sample Sample #7 makes up one chunk Chunk #3, the subsequent one sample Sample #8 makes up one chunk Chunk #4, and the final one sample Sample #9 makes up one chunk Chunk #5.

With the ISO base media file format, the display (output) start time for starting display (output) of each sample is registered in some type of database called a sample table atom (hereafter, referred to atom as appropriate). The term "atom" denotes a database structure for storing metadata (information, attribute) relating to media data. The details regarding atom are described in, for example, ISO/IEC 14496-12: 2005 (E) Part 12: ISO base media file format.

FIGS. 2A through 2D illustrate the overview of the atom of the media data in FIG. 1. Examples of the atom include a time-to-sample atom, sample size atom, sample-to-chunk atom, and chunk offset atom. FIG. 2A illustrates the overview of the time-to-sample atom which is the media data in FIG. 1. A sample has reproduction time (section) called duration, and the time-to-sample atom represents the correspondence between duration (Sample duration), and the number of samples (Sample count) having the duration thereof. The time-to-sample atom in FIG. 2A represents that there are four samples of duration=3, two samples of duration=1, and three samples of duration=2, respectively.

FIG. 2B illustrates the overview of the sample size atom which is the media data in FIG. 1. The sample size atom represents the correspondence between a sample, and the size of the sample thereof by the number of bytes (size).

FIG. 2C illustrates the overview of the sample-to-chunk atom which is the media data in FIG. 1. The sample-to-chunk atom represents the relationship between samples and chunks, and the sample-to-chunk atoms regarding chunks having the same number of samples (Sample-per-chunk), and the same attribute (Sample Description ID) are summarized to one entry (record).

That is to say, (information representing) the chunk of the top of one or more consecutive chunks (First chunk) having the same number of samples and the same attribute, and the number of samples and the attribute (Sample Description ID) of the one or more chunks thereof are described in the sample-to-chunk atom.

Of the media data in FIG. 1, with regard to each of the top chunk Chunk #1 and the second (second from the top) chunk Chunk #2, the number of samples is three, and the Sample Description ID is 23. Therefore, the first row entry from the top of the sample-to-chunk atom in FIG. 2C describes that the top chunk of consecutive two chunks Chunk #1 and Chunk #2 of which the number of samples is three, and the Sample Description ID is 23 is chunk Chunk #1, the number of samples making up the chunk thereof is three, and the Sample Description ID thereof is 23.

Also, of the media data in FIG. 1, with regard to each of the third chunk Chunk #3 and the fourth chunk Chunk #4, the number of samples is one, and the Sample Description ID is 23. Therefore, the second row entry from the top of the sample-to-chunk atom in FIG. 2C describes that the top chunk of consecutive two chunks Chunk #3 and Chunk #4 of which the number of samples is one, and the Sample Description ID is 23 is chunk Chunk #3, the number of samples making up the chunk thereof is one, and the Sample Description ID thereof is 23.

Further, of the media data in FIG. 1, with regard to the final (fifth) chunk Chunk #5, the number of samples is one, and the Sample Description ID is 24. Therefore, the third row entry from the top of the sample-to-chunk atom in FIG. 2C describes that the top chunk of one chunk Chunk #5 of which the number of samples is one, and the Sample Description ID is 24 is chunk Chunk #5, the number of samples making up the chunk thereof is one, and the Sample Description ID thereof is 24.

FIG. 2D illustrates the overview of the chunk offset atom which is the media data in FIG. 1. The chunk offset atom represents the correspondence between a chunk, and the relative position (offset) from the top of a file of the chunk thereof by the number of bytes (size). Note that with the ISO base media file format, the display start time of each sample is described (registered) in an atom.

With regard to a moving picture and audio, (the time immediately after) display end time when display (output) of a certain sample is completed becomes the display (output) start time of the next sample, so display (output) of each sample is started when the display (output) start time of the sample thereof comes, whereby consecutive moving picture and audio are displayed (output). On the other hand, in order to display subtitles by being superimposed on a moving picture, subtitle data relating to the subtitles thereof has to be stored in a file conforming to the ISO media file format as media data.

Here, subtitles are an image such as characters superimposed and displayed on a certain area on a moving picture for a certain period of time (moving picture reproduction section) alone.

FIGS. 3A and 3B are diagrams describing display of subtitles. With regard to subtitles, display is started by being superimposed on a moving picture, and upon a certain period of time elapsing, display is eliminated, which is repeated as appropriate. That is to say, subtitles are displayed in an intermittent manner.

The management of samples conforming to the ISO base media file format is premised on samples being displayed (output) continuously with no gap. Therefore, with the ISO base media file format, a method for managing media data to be displayed in a discontinuous manner such as subtitles, i.e., a method for storing subtitle data in a file is not established as standard.

Accordingly, for example, if we say that subtitle data relating to one subtitle is handled as one sample, the ISO base media file format causes an inconvenience in that a section (duration) where no subtitle is displayed between a certain subtitle and a subtitle to be displayed next, or a section where no subtitle is displayed from the top of a moving picture until the first subtitle is displayed is not defined (stipulated).

That is to say, FIG. 3A illustrates display of subtitles in a case where subtitle data relating to one subtitle is handled as one sample. In a case where subtitle data relating to one subtitle is handled as one sample, a section where no subtitle is displayed between a certain subtitle and a subtitle to be displayed next, shown in L1 in FIG. 3A, and a section from the top of a moving picture until the first subtitle is displayed, shown in L2 in FIG. 3A, are not defined.

To this end, FIG. 3B illustrates display of subtitles in a case where after display of a subtitle is started, and the subtitle thereof is eliminated until (immediately before) display of the next subtitle is started (or until the end of the moving picture) is handled as one sample. In a case where after display of a subtitle is started until display of the next subtitle is started is handled as one sample, samples of a subtitle are arrayed densely in the reproduction time order as well as samples of a moving picture or audio.

However, even in this case, the inconvenience that a section where no subtitle is displayed from the top of a moving picture until the first subtitle is displayed is not defined, is not eliminated. Further, upon a section where a subtitle is displayed, and a section where after the subtitle thereof is eliminated, the subtitle thereof is not displayed being handled as one sample, a section of one sample of a subtitle is not unexceptionally identical to a section where a subtitle is displayed.

Accordingly, an atom conforming to the ISO base media file format causes an inconvenience wherein a sample section can be recognized, but a section where a subtitle is actually displayed (actual display section) is not recognized.

Therefore, the data structure (format) of subtitle data suitable for the ISO base media file format is defined, and further, the format of a file conforming to the ISO base media file format in which the subtitle data of the data structure thereof is stored (hereafter, referred to as "new format") is defined.

The new format will be described with reference to FIG. 4. With the new format, a stream to be stored in the file includes at least moving picture data relating to a moving picture, and subtitle data relating to a subtitle to be displayed over the whole display section of the moving picture thereof. Further, with a section where display of a subtitle is constant as display units of subtitles, the subtitle data is classified into display sets which are subtitle data in the display units thereof.

That is to say, with the new format, subtitles are deemed to be displayed over the whole display section of a moving picture. However, with regard to a section where a subtitle is not displayed (non-display section), "no" (nonexistent or invisible) subtitle is deemed to be displayed. Further, a section where display of a subtitle (including "no" subtitle) is constant, such that the color of a subtitle, and others are not changed, is taken as the display units of subtitles, and subtitle data is defined independently in the display units.

Now, if we say that subtitle data serving as display units is referred to as a display set, with the new format, subtitle data relating to a subtitle displayed over the whole display section of a moving picture is classified into display sets.

With the new format, regarding a section where a (visible) subtitle is displayed (display section), there is the display set of the subtitle thereof, and regarding a non-display section of subtitles, there is "no" subtitle display set.

Also, for example, in a case where after display of a certain subtitle, the color, characters, display position, or the like of the subtitle thereof is changed, there has to be subtitle data for the change thereof, so the subtitle before change, and the subtitle after change are defined with a different display set.

With new format, a series of subtitles to be superimposed and displayed on a moving picture serving as a content can be defined with a group of one or more display sets. Also, with the new format, one display set corresponds to one sample conforming to the ISO base media file format.

Figure 4:
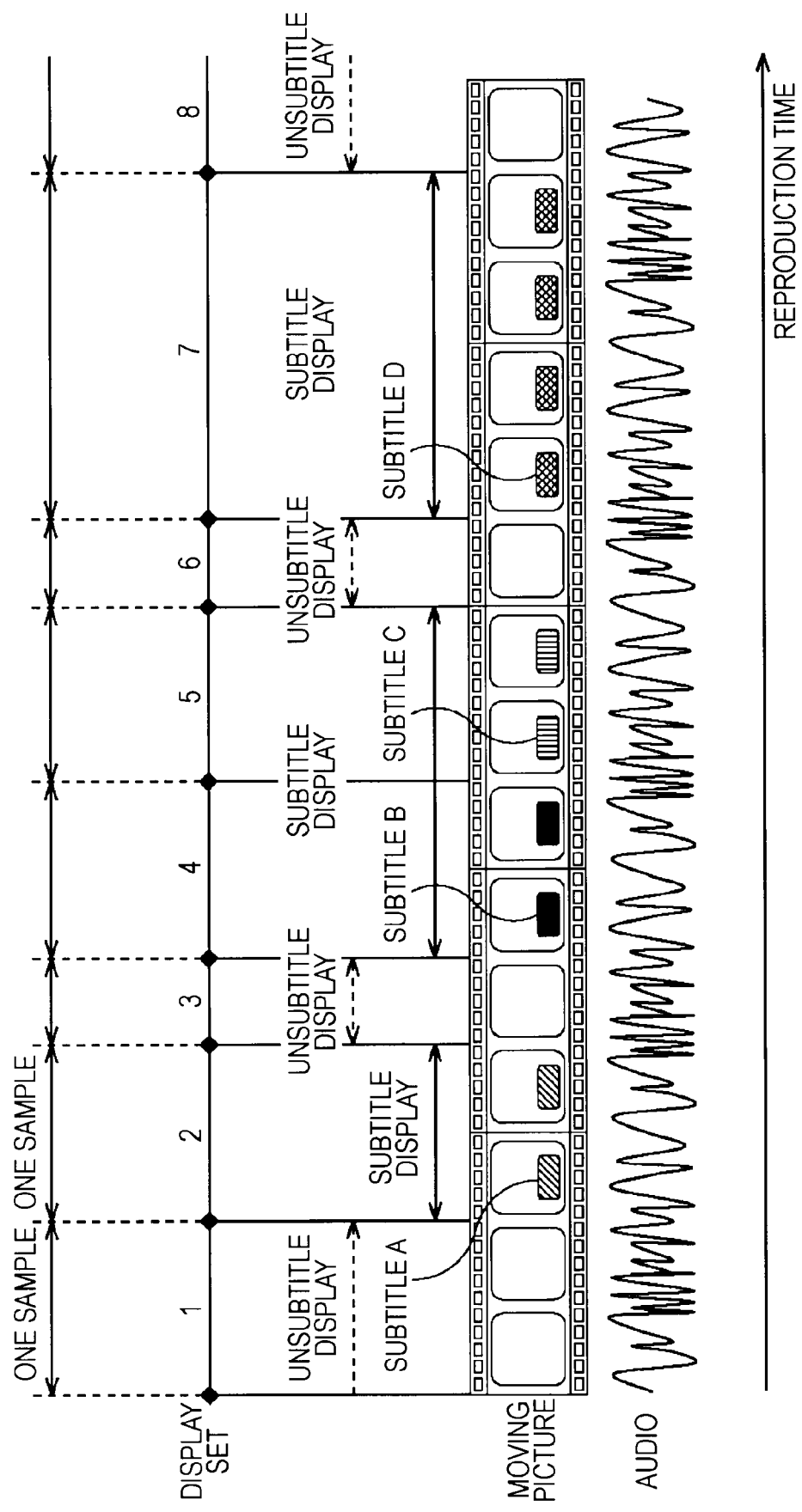
FIG. 4 is a diagram describing a new format.

FIG. 4 illustrates the correspondence between a display set and a sample. In FIG. 4, the display set (display set of "no" subtitle) #1 of a non-display section which hides a subtitle, the display set (display set for displaying subtitle A) #2 of a subtitle A, the display set #3 of a non-display section, the display set #4 of a subtitle B, the display set #5 of a subtitle C, the display set #6 of a non-display section, the display set #7 of a subtitle D, and the display set #8 of a non-display section are arrayed in the temporal order. Each of the display sets #1 through #8 corresponds to one sample.

As described above, a section where display of a subtitle is constant including "no" subtitle is taken as display units of subtitles, and a display set which is subtitle data in the display units thereof is defined, whereby the inconvenience that a section where a subtitle is not displayed (non-display section) is not defined (stipulated), and the inconvenience that a subtitle display section is not recognized due to that the section of one sample of a subtitle is not identical to a section where a subtitle is displayed (display section), can be eliminated.

Subsequently, as a result thereof, subtitle data can be stored in a file conforming to the ISO base media file format (subtitle data can be stored so as to display a subtitle appropriately).

Also, the subtitle data of a section where display of a subtitle is constant (display units) is taken as a display set, whereby the subtitle can be displayed suitably.

Specifically, for example, in FIG. 4, tentatively, in a case where the consecutive two display sets #4 and #5 are united to form one display set, according to the display set united from the display sets #4 and #5 (hereafter, referred to "united display set"), first, the subtitle B is displayed, and subsequently, the subtitle C is displayed instead of the subtitle B.

Accordingly, for example, in a case where random access is performed during the section of the display set #5 where the subtitle C should be displayed, according to the united display set, the subtitle B is displayed instead of the subtitle C to be displayed during the section of the display set #5.

On the other hand, in a case where there are the display sets #4 and #5 classified during a section the display of a subtitle is constant, when random access is performed during the section of the display set #5 where the subtitle C should be displayed, the subtitle C is displayed. As described above, the subtitle to be displayed during the section thereof can be displayed.

Figure 5:
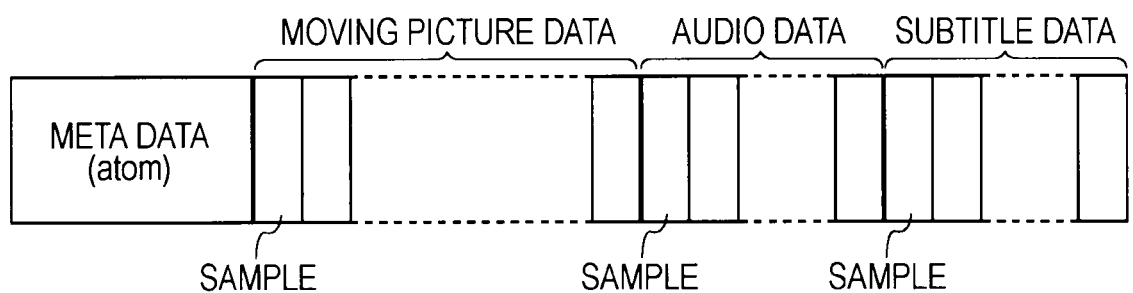
FIG. 5 is a diagram illustrating an example of a stream to be stored in a file of the new format.

FIG. 5 illustrates an example of a stream to be stored in a new-format file. The stream to be stored in a new-format file is a stream conforming to the ISO base media file format, and in FIG. 5, metadata including an atom is disposed in the top of the stream thereof.

Subsequent to the metadata, moving picture data, audio data, and subtitle data are disposed in order. Each of the moving picture data, audio data, and subtitle data is data in units of samples. Note that the stream to be stored in a new-format file may be a stream conforming to not the ISO media file format but the MP4 file format.

As described above, the sample of the subtitle data of the new format is a display set. The display sets include the image data of a subtitle, and data such as coordinates, color (pallet), and so forth representing the display area of a subtitle on the screen (moving picture).

Further, the display sets additionally include later-described number_of_region_composition_objects serving as number-of-subtitles information representing the number of subtitles to be displayed on one screen, later-described T-value serving as transparency information representing the transparency of a subtitle, and so forth.

Now, the number_of_region_composition_objects is configured of the id (identification) of a subtitle (object) to be displayed on one screen (frame or field), id representing the display area of the subtitle, and (the information of) the display position of the subtitle. Also, the T-value takes a value of 0 or more, and in a case where the value is 0, this represents that the subtitle is completely transparent (colorless and transparent).

With a display set during a non-display section, the number_of_region_composition_objects serving as number-of-subtitles information representing the number of subtitles to be displayed on one screen is set to 0, or the T-value serving as transparency information representing the transparency of a subtitle is set to 0.

In a case where the number_of_region_composition_objects is 0, there is no subtitle to be displayed. Therefore, according to a display set of which the number_of_region_composition_objects is 0, a nonexistent subtitle is displayed, and thus, hiding of a subtitle is realized.

Also, in a case where the T-value is 0, a completely transparent subtitle is displayed. Therefore, according to a display set of which the T-value is 0, a completely transparent subtitle, i.e., invisible subtitle is displayed, and thus, hiding of a subtitle is realized.

Specifically, when displaying a display set (of a subtitle), a later-described reproducing device for reproducing a new-format file clears (eliminates) a subtitle within a region which is a display area where a subtitle is displayed. Accordingly, if a subtitle displayed by the last display set in the display order exists within the region, the subtitle thereof is cleared.

The reproducing device starts drawing of a new subtitle after clearing a subtitle within the region. At this time, in the event that the number of subtitles (objects) to be displayed is 0, nothing is drawn within the region. Also, in the event that a subtitle to be displayed is completely transparent, a completely transparent subtitle is drawn within the region. In either case, the subtitles are not displayed equivalently.

Figure 6:
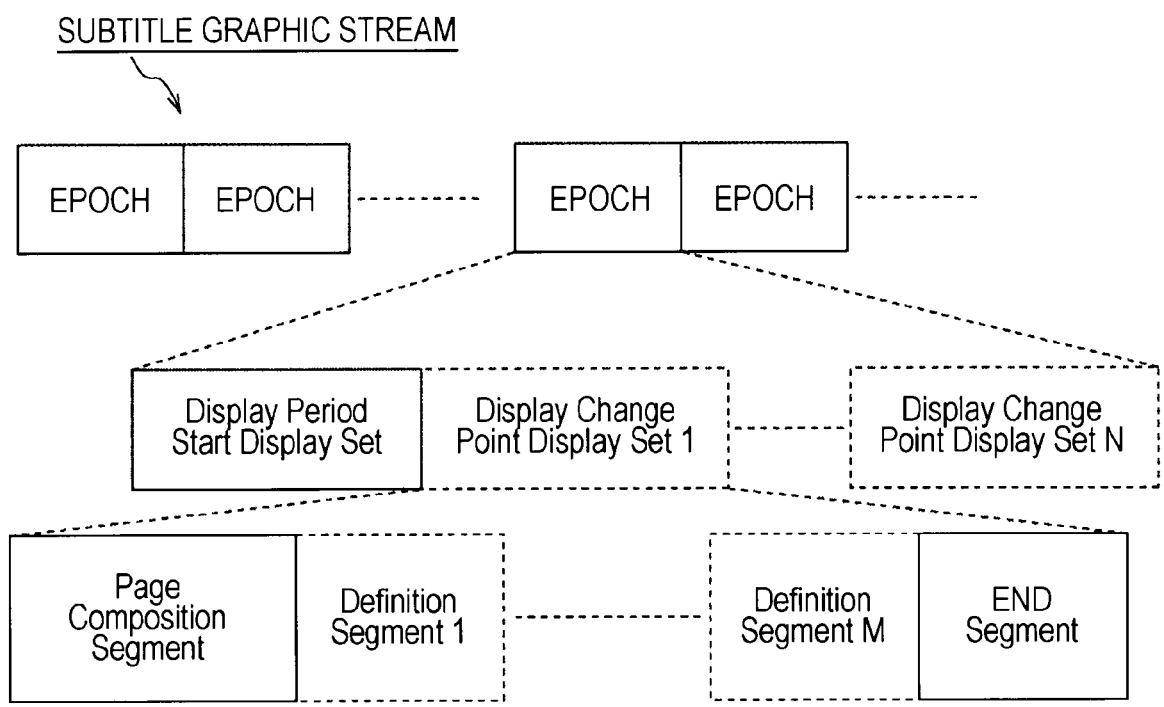
FIG. 6 is a diagram illustrating an example of the data structure of subtitle data to be stored in a file of the new format.

FIG. 6 schematically illustrates the data structure of subtitle data (subtitle graphics stream) stored in a new-format file. Note that the data structure of the subtitle data in FIG. 6 has high compatibility as to BD-ROM (Blu-Ray Disc Read Only Memory), and the data of a subtitle stipulated by the AVCHD specification. Accordingly, the reproducing device for reproducing a new-format file can be readily manufactured by improving a device for reproducing BD-ROM or a recording medium conforming to the AVCHD specification. That is to say, when reproducing a new-format file, a reproducing device only for the file thereof does not have to be manufactured from the beginning.

In FIG. 6, subtitle data is made up of an array of one or more epochs. One epoch is made up of an array of one or more display sets. As for the types of display set, there are two types of a Display Period Start display set, and a Display Change Point display set.

The epochs are made up of one Display Period Start display set, and 0 or more Display Change Point display set. Specifically, a Display Period Start display set is disposed at the top of the epochs, and thereafter, 0 or more Display Change Point display sets are disposed. The epochs are activated one at a time in the display order of subtitles, and the reproducing device for a new-format file maintains memory management regarding effective epochs. Specifically, while an epoch is activated, the reproducing device maintains the storage of data relating to the epoch thereof (including the status of the reproducing device which processes the epoch). Also, in a case where after a certain epoch is activated, (the epoch thereof is inactivated), the next epoch is activated, the reproducing device does not maintain the data relating to the last activated epoch.

The epochs are units where the storage content of a subtitled plane for displaying a subtitle (the storage area of the memory for displaying a subtitle where (the image data of) a subtitle is drawn) is maintained, and the subtitled plane is cleared when an effective epoch is switched, i.e., at timing of a Display Period Start display set disposed in the top of the effective epoch. Note that the region of the subtitled plane is cleared at timing of a Display Change Point display set, as described above.

While an epoch is activated, one pallet table (CLUT (Color Look Up Table)), and up to two subtitles (objects) can be activated as to the activated epoch thereof. Accordingly, with the present embodiment, up to two subtitles can be displayed on one screen simultaneously. Note that the number of subtitles to be displayed simultaneously is not restricted to two, just one, or three or more, subtitles may be displayed simultaneously.

The display sets are basic components of subtitle data, and are a group of segments. Specifically, the display sets are made up of two or more segments, and begin from a Page Composition Segment (hereafter, also referred to as PCS), and end at an END Segment. Zero or more Definition Segments are inserted (disposed) between a PCS and END Segment.

As to the PCS of the top of a display set, PTS (Presentation Start Time) representing display start time for starting display of (the subtitle of) the display set thereof is added. Accordingly, the display sets include PTS, and become the minimum units wherein display start time can be specified. Each of the display sets is activated when the time represented with the PTS of (the PCS included in) the display set thereof comes.

Note that a display set to be activated is a display set included in an activated epoch. Also, two or more display sets are not activated simultaneously, and accordingly, when a certain display set is activated, the display set which has been activated at that time ends (is inactivated).

Figure 7:
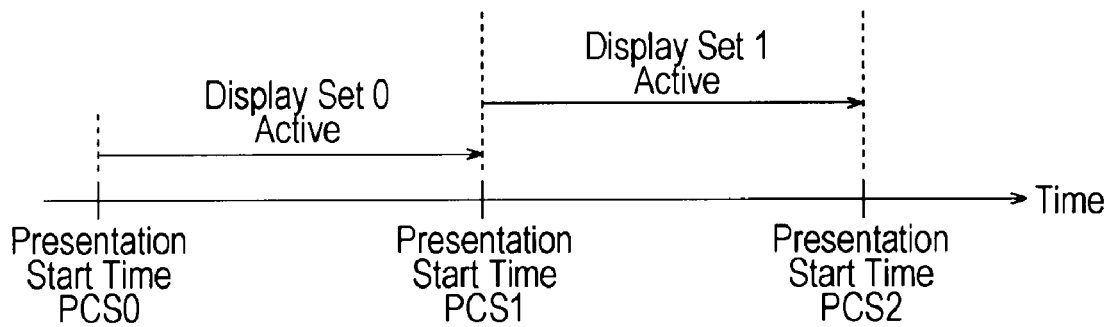
FIG. 7 is a diagram illustrating timing wherein a display set is activated.

FIG. 7 illustrates timing when a display set is activated. Let us say that a certain Display Set #0 includes PCS #0, and a Display Set #1 to be displayed next (of which the subtitle is displayed) includes PCS #1.

When the display start time represented with the PTS added to the PCS #0 comes, the Display Set #0 including the PCS #0 thereof is activated, and (the subtitle of) the Display Set #0 thereof is displayed. Thereafter, when the display start time represented with the PTS added to the PCS #1 comes, the Display Set #0 is inactivated, and instead, the Display Set #1 including the PCS #1 is activated. Subsequently, the activated Display Set #1 is displayed.

Figure 8A:
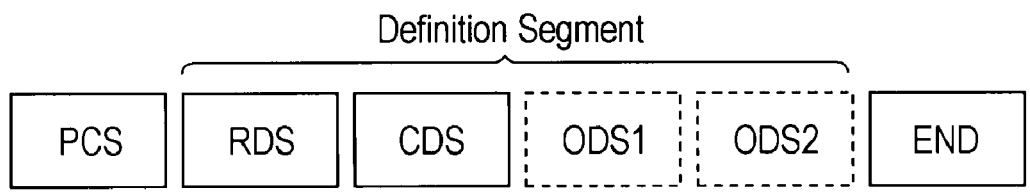
FIGS. 8A and 8B are diagrams illustrating an example of the data structure of a display set.
Figure 8B:
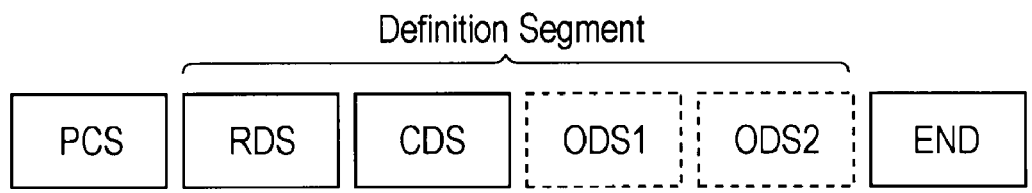

FIGS. 8A and 8B illustrate the data structure of a display set. As described above, as for the types of display set, there are two types of a Display Period Start display set, and a Display Change Point display set.

FIG. 8A illustrates the data structure of the Display Period Start display set, and FIG. 8B illustrates the data structure of the Display Change Point display set. The Display Period Start display set and Display Change Point display set have the same data structure. Specifically, as described in FIG. 6, the display sets include a PCS disposed on the top thereof, and an END segment to be disposed last (hereafter, also referred to as END). That is to say, the display sets start from only one PCS, and end at only one END. The PCS refers to only an object defined within the display set including the PCS thereof.

Definition Segments are disposed between the PCS and END. As for the types of Definition Segments, there are three types of a Region Definition Segment (hereafter, also referred to as RDS) for defining a region, a CLUT Definition Segment (hereafter, also referred to as CDS) for defining a pallet color, and an Object Definition Segment (hereafter, also referred to as ODS) for storing the image data of a subtitle.

The display sets include only one RDS. The RDS defines all of the available regions (display area where a subtitle is displayed) within an epoch including the RDS thereof. The size and position of a region does not change within an epoch. With the RDS, for example, up to two regions can be defined.

Further, the display sets include only one CDS. The CDS defines the information of available colors (CLUT) within a display set including the CDS thereof. With the CDS, the whole color data except for the color data of a default value (later-described CLUT_entry( )) is defined. Also, the display sets can include up to two ODS. With the ODS, all the objects referenced from the PCS are defined.

The difference between the two types of display set, i.e., the difference between the Display Period Start display set (FIG. 8A) and the Display Change Point display set (FIG. 8B) is only regarding whether to represent the top of an epoch. Specifically, the Display Period Start display set represents the top (start) of an epoch. Also, information for displaying a subtitle first within an epoch is stored in the Display Period Start display set. On the other hand, in a case where the display of a subtitle changes within an epoch, information for the change thereof is stored in the Display Change Point display set.

Both of the Display Period Start display set and Display Change Point display set include information for displaying a subtitle, and are also places capable of starting reproduction including decode and so forth within an epoch.

Accordingly, with the reproducing device, even when subtitle data is read in the middle of an epoch, if a Display Change Point display set in a perfect condition can be read in, (the subtitle of) the display of the Display Change Point display set thereof can be started.

FIG. 9 illustrates an example of the syntax of the PCS. The PCS principally stores the attribute information of a moving picture such as the resolution, frame rate, and the like of a moving picture on which a subtitle is superimposed, the type of the display set (whether the display set including the PCS thereof is the Display Period Start display set or Display Change Point display set), the id of an object (the image data of a subtitle) making up a subtitle, the id of the region where a subtitle is displayed, and coordinate information for disposing an object on the subtitled plane.

Specifically, in FIG. 9, segment_type represents the type of segment. As for segments, there are five types of the PCS, END, RDS, CDS, and ODS described in FIGS. 6 and 8. The value representing that the segment is the PCS is set to the segment_type of the PCS.

The segment_length represents the length from immediately after the field of this segment_length to the end of the segment (PCS).

The video_horizontal_size represents the size in the horizontal direction of a moving picture on which the subtitle of the display set including this PCS is superimposed. Specifically, the value representing the number of pixels in the horizontal direction of a video plane which is the storage area of the memory where (the image data of) a moving picture is drawn, which is for displaying a moving picture, is set to the video_horizontal_size.

The video_vertical_size represents the size in the vertical direction of a moving picture on which the subtitle of the display set including this PCS is superimposed. Specifically, the value representing the number of lines in the vertical direction of the video plane is set to the video_vertical_size.

The video_frame_rate represents the frame rate of a moving picture on which the subtitle of the display set including this PCS is superimposed.

The page_version_number represents the version number of the PCS. Specifically, the value obtained by incrementing the value of the page_version_number of the PCS included in the display set to be displayed immediately before the display set including this PCS, for example, by one is set to the page_version_number.

However, in a case where the object of the subtitle of the display set including this PCS is the same as the object of the subtitle of the display set to be displayed immediately before (hereafter, also referred to as "the last display set") (in a case where display of a subtitle is performed by employing (the object_data of) the ODS employed for display of a subtitle), the same value as the value of the page_version_number of the PCS included in the last display set is set to the page_version_number.

Specifically, for example, in a case where the characters of the subtitle of the display set including this PCS are the same characters of the subtitle of the last display set except for the color thereof, the same value as the value of the page_version_number of the PCS included in the last display set is set to the page_version_number.

Accordingly, the value obtained by incrementing the value of the page_version_number of the PCS included in the last display set only by one is basically set to the page_version_number of the Display Period Start display set.

Also, the value obtained by incrementing the value of the page_version_number of the PCS included in the last display set, or the same value is set to the page_version_number of the Display Change Point display set depending on whether or not the object of the subtitle of the Display Change Point display set is the same as the object of the subtitle of the last display set.

The page_state represents the type of display set. Specifically, information representing whether the display set including this PCS is the Display Period Start display set or Display Change Point display set is set to the page_state.

The ref_to_CLUT_id represents CLUT_id which is an id for determining the CLUT employed for display (of the subtitle) of the display set including this PCS. The CLUT_id is defined in the CDS.

The number_of_region_composition_objects represents the number of the region_composition_object( ) defined in this PCS. With the present embodiment, the integer value in a range of 0 through 2 can be set to the number_of_region_composition_objects.

The region_composition_object( ) includes ref_to_object_id, ref_to_region_id, object_horizontal_position, and object_vertical_position. region_composition_object( ) is employed when the reproducing device for reproducing a new-format file draw pixels within the region on the subtitled plane. That is to say, for example, according to the region_composition_object( ), determination of (the object_data of) the object (ODS) of the subtitle to be displayed, determination of the region where a subtitle is displayed, or the like is performed.

Note that the one region_composition_object( ) is correlated with a later-described region( ) to be defined with the RDS within the display set including this PCS. The one region( ) can be correlated with, for example, up to the two region_composition_object( ).

The ref_to_object_id represents object_id which is an id determining the object of the subtitle of the display set including this PCS. The object_id is defined with the ODS.

The ref_to_region_id represents region_id which is an id for determining the region( ) specifying (defining) the region employed for display (of the subtitle) of the display set including this PCS. The region_id is defined with the RDS.

Note that the whole of (the pixels of) the object of the subtitle determined with the above-mentioned ref_to_object_id has to be included in the range of the region specified with the region( ) determined with the ref_to_region_id.

The object_horizontal_position represents the coordinates in the horizontal direction, of the display position of the pixel on the upper left of the object of the subtitle determined with the ref_to_object_id. The origin of the coordinates is the point of the pixel on the upper left of the subtitled plane (graphics plane). The value of the object_horizontal_position has to be included in the range of the region specified with the region( ) determined with the ref_to_region_id.

The object_vertical_position represents the coordinates in the horizontal direction, of the display position of the pixel on the upper left of the object of the subtitle determined with the ref_to_object_id. The origin of the coordinates is, in the same way as with the case of the object_horizontal_position, the point of the pixel on the upper left of the subtitled plane (graphics plane). The value of the object_vertical_position has to be included in the range of the region specified with the region( ) determined with the ref_to_region_id, in the same way as with the case of object_horizontal_position.

Here, the number of the region_composition_object( ) to be provided is the same as the number of subtitles to be displayed on the display set including this PCS. Accordingly, it can be said that the number_of_region_composition_objects representing the number of the region_composition_object( ) is the number-of-subtitles information representing the number of subtitles to be displayed on one screen.

With a display set during a non-display section, for example, the number_of_region_composition_objects serving as the number-of-subtitles information is set to 0, and a nonexistent subtitle is displayed, thereby hiding the subtitle.

FIG. 10 is a diagram describing the value taken by the page_state in the PCS in FIG. 9. The page_state takes a value of two bits. However, of the value of two bits, 00b (b represents that the previous value thereof is binary) and 11b are reserved for future extension.

In a case where the page_state is 01b, this represents that the display set including the PCS having the page_state thereof is a Display Change Point display set.

In a case where the page_state is 10b, this represents that the display set including the PCS having the page_state thereof is a Display Period Start display set which is the start (top) display set of an epoch.

FIG. 11 illustrates an example of the syntax of the RDS. The RDS defines, of the region which is a rectangular display area on the display screen where a subtitle is displayed, for example, the coordinates on the upper left, the pixel size in the horizontal direction, and the pixel size in the vertical direction. A subtitle is displayed only within the region defined with the RDS.

The segment_type represents the type of segment, such as described in FIG. 9. A value representing that the segment is the RDS is set to the segment_type in the RDS.

The segment_length represents the length from immediately before the field of the segment_length to the end of the segment (RDS).

The number_of_regions represents the number of the region( ) defined with this RDS. With the present embodiment, an integer value in a range of 0 through 2 can be set to the number_of_regions.

The region( ) includes region_id, region_horizontal_position, region_vertical_position, region_width, and region_height. The region( ) defines the region for displaying the object of the subtitle determined with the ref_to_object_id in the PCS (FIG. 9) (the region of the subtitled plane where the object is drawn).

Note that, with the one RDS, up to two regions can be defined with the two regions( ). However, the two regions defined with the one RDS do not have to include overlapping.

The region_id is a unique number determining the region. The value of the region_id has to be, for example, either 00h (h represents that the previous value is a hexadecimal number) or 01h.

Also, as described above, with the one RDS, up to the two region( ) can be defined, but in a case where with the one RDS, the two region( ) are defined, each value of the region_id of the two region( ) thereof has to be a unique value (different value).

The region_horizontal_position represents the coordinates in the horizontal direction on the subtitled plane, of the position of the pixel on the upper left of the region determined with the region_id (region defined with the region( )). The origin of the coordinates is the point of the pixel on the upper left of the subtitled plane. The value of the region_horizontal_position has to be included in a range from 0 to the video_horizontal_size (FIG. 9)—1.

The region_vertical_position represents the coordinates in the vertical direction on the subtitled plane, of the position of the pixel on the upper left of the region determined with the region_id. The origin of the coordinates is, similar to the case of the region_horizontal_position, the point of the pixel on the upper left of the subtitled plane. The value of the region_vertical_position has to be included in a range from 0 to the video_vertical_size (FIG. 9)—1.

The region_width represents the breadth (the length in the horizontal direction) of the region determined with the region_id. The value of the region_width has to be included in a range from 1 to the video_horizontal_size (FIG. 9)—region_horizontal_position (FIG. 11).

The region_height represents the height (the length in the vertical direction) determined with the region_id. The value of the region_height has to be included in a range from 1 to the video_vertical_size (FIG. 9)—region_vertical_position (FIG. 11).

Figure 12:
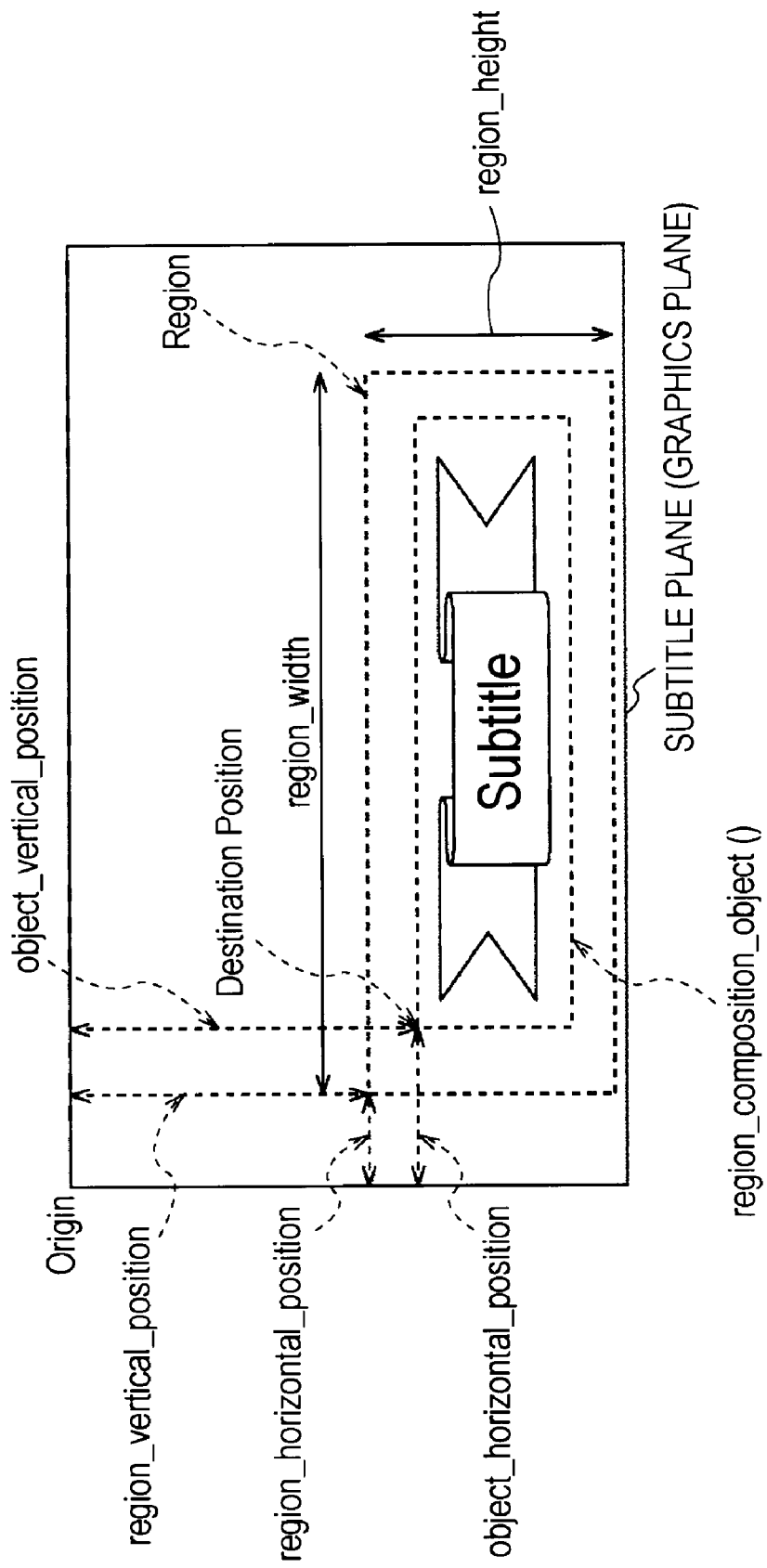
FIG. 12 is a diagram illustrating the relationship of a subtitle, region, and subtitled plane.

FIG. 12 illustrates the relationship between (the object of) a subtitle, region, and subtitled plane. According to the region_composition_object( ) in the RCS (FIG. 9), (the object of) a subtitle to be displayed, the region to display the subtitle thereof, and so forth are determined. Specifically, the object of a subtitle is determined with the ref_to_object_id (FIG. 9) included in the region_composition_object( ).

Also, according to the object_horizontal_position and object_vertical_position included in the region_composition_object( ) (FIG. 9), each of the coordinates in the horizontal and vertical directions, of the display position (destination position) of the pixel on the upper left of the object of a subtitle, is determined.

Further, according to the region_horizontal_position and region_vertical_position (FIG. 11) included in the region( ) (region( ) having the same value as that indicated by ref_to_region_id) determined with the ref_to_region_id included in the region_composition_object( ) (FIG. 9), each of the coordinates in the horizontal and vertical directions on the subtitled plane, of the position of the pixel on the upper left of the region where a subtitle is displayed, is determined.

Also, according to the region_width and region_height included in the region( ), the breadth and height of the region where a subtitle is displayed are determined, respectively.

FIG. 13 illustrates an example of the syntax of the CDS. CLUT (color pallet data) is stored in the CDS. The CLUT includes the information of the color and transparency on the subtitled plane for the number of colors worth available within an epoch.

Specifically, the CDS defines a set of CLUT_id which is an id for uniquely determining the CLUT (Color Look Up Table) which is a group of color data, CLUT_version_number which is the version number of the CLUT, color data including brightness Y, color difference Cr and Cb, and transparency T as components, and id (index) determining the color data thereof (CLUT_entry_id).

The segment_type represents the type of segment, as described in FIG. 9. A value representing that the segment is the CDS is set to the segment_type in the CDS.

The segment_length represents the length from immediately before the field of the segment_length to the end of the segment (CDS).

The CLUT_id represents a unique number determining (the CLUT stored in) this CDS. With the present embodiment, the CLUT_id is, for example, fixed to 00h.

The CLUT_version_number represents the version number of (the CLUT stored in) this CDS within an epoch.

Upon a new CLUT definition segment being installed to an epoch, the value of the CLUT_version_number is set (reset) to 0. Upon a CDS different from the last CDS being introduced, the value of the CLUT_version_number is set to, for example, the value obtained by incrementing the value of the CLUT_version_number in the last CDS by one.

Specifically, the CLUT_version_number in the first CDS within an epoch is set to 0. With the CLUT_version_number in the subsequent CDS, in a case where the CLUT (CLUT_entry( )) in the CDS thereof differs from the CLUT in the last CDS within an epoch, the value obtained by incrementing the CLUT_version_number in the last CDS by one is set thereto, and in a case where the CLUT in the CDS thereof is the same as the CLUT in the last CDS, the same value as the CLUT_version_number in the last CDS is set thereto.

The CLUT_entry( ) is the entry (record) of the CLUT, and includes CLUT_entry_id, Y-value, Cr-value, Cb-value, and T-value.

The CLUT_entry_id represents the number (index) of the entry of the CLUT. According to the CLUT_entry_id, a certain color is determined.

Note that the CLUT_entry_id is, for example, 8 bits, and takes a value in a range of 00h through FFh. However, the entry CLUT_entry( ) of which the CLUT_entry_id is FFh is not (may not be) stored in the CDS. Accordingly, the entry CLUT_entry( ) of which the CLUT_entry_id is FFh does not (may not) exist.

The color data of the entry CLUT_entry( ) of which the CLUT_entry_id is FFh is handled as, for example, a completely transparent color serving as a default value.

Thus, up to 255 CLUT_entry( ) of which the CLUT_entry_id is 00h through FEh can be stored in the CDS can be stored in the CDS, and as for the color of a subtitle, up to 256 colors including a transparent color (in the case of the CLUT_entry_id being FFh) can be employed simultaneously.

The Y-value represents the brightness Y of the color data of the entry CLUT_entry( ) which the CLUT_entry_id represents. The Y-value takes, for example, a value of 16 through 235.

The Cr-value represents the color difference Cr of the color data of the entry CLUT_entry( ) which the CLUT_entry_id represents. The Cr-value takes, for example, a value of 16 through 240.

The Cb-value represents the color difference Cb of the color data of the entry CLUT_entry( ) which the CLUT_entry_id represents. The Cb-value takes, for example, a value of 16 through 240.

Note that the brightness Y and color difference Cr and Cb conform to the Rec. ITU-R BT.601-5, and Rec. ITU-R BT.709-5 specifications.

The T-value represents the transparency T of the color data of the entry CLUT_entry( ) which the CLUT_entry_id represents. The T-value takes a value of 0 through 255. The T-value of which the value is 255 represents that the color is completely opaque, and the smaller the value of the T-value is, the greater the transparency is. The T-value of which the value is 0 represents that the color is completely transparent.

Here, the default value of the T-value is, for example, defined as 0. Also, with regard to the Y-value, Cr-value, and Cb-value, no default value is defined.

Note that all of the 255 entries CLUT_entry( ) of which the CLUT_entry_id is 00h through FFh have not to be stored in the CDS.

However, as described above, the color data of the entry CLUT_entry( ) of which the CLUT_entry_id is FFh is handled as a completely transparent color, and the entry CLUT_entry( ) thereof is not (may not be) stored in the CDS. In this case, the color data of the entry CLUT_entry( ) not stored in the CDS is handled as a completely transparent color.

Here, the T-value can be referred to as transparency information representing the transparency of a subtitle. With a display set during a non-display section, for example, the T-value serving as this transparency information is taken as a value representing that the color is completely transparent, i.e., taken as 0 serving as a default value, and an invisible subtitle is displayed, and accordingly, the subtitle is hidden.

Note that, in order to hide a subtitle, with all of the entries CLUT_entry( ) of CLUT stored in the CDS, the T-value has to be set to 0, but with the present embodiment, this can be performed equivalently by storing no entry CLUT_entry( ) of CLUT in the CDS.

FIG. 14 illustrates an example of the syntax of the ODS. The object (image data) of a subtitle, object_id which is an id for determining the object thereof uniquely, and the version number of the object (object_version_number), and so forth are stored in the ODS.

The segment_type represents the type of segment, as described in FIG. 9. A value representing that the segment is the ODS is set to the segment_type in the ODS.

The segment_length represents the length from immediately before the field of the segment_length to the end of the segment (ODS).

The object_id is a unique number determining the object of a subtitle defined with this ODS. With the present embodiment, as described above, up to two subtitles can be displayed simultaneously with one epoch, the object_id is set to either 0000h or 0001h to determine the objects of up to two subtitles.

The object_version_number represents the version number of an object defined with this ODS.

The image data of one subtitle, and the other data are stored in object_data( ).

Specifically, the object_data( ) includes object_length, object_horizontal_size, object_vertical_size, and encoded_data_string( ).

The object_length represents the number of bytes from the field immediately after the field of the object_length to the end of the object_data( ).

The object_horizontal_size represents the number of pixels in the breadth (horizontal direction) of an object. The breadth of an object has to be at or above eight pixels, for example. Accordingly, the value of the object_horizontal_size has to be a value from 8 to the video_horizontal_size (FIG. 9).

The object_vertical_size represents the number of pixels in the height (vertical direction) of an object. The height of an object has to be at or above eight pixels, for example. Accordingly, the value of the object_horizontal_size has to be a value from 8 to the video_horizontal_size (FIG. 9).

The encoded data obtained by subjecting the image data (object) of a subtitle to, for example, the run length compression is stored in the encoded_data_string( ).

Note that the object of a subtitle to be displayed within an epoch can be updated (changed), for example, by disposing multiple display sets including the ODS in which different coded_data_string( ) is stored within an epoch.

Also, the image data of a subtitle includes, for example, the CLUT_entry_id (FIG. 13) as a pixel value.

FIG. 15 illustrates an example of the syntax of the END. The END represents the end of a display set which is a group of segments.

The segment_type represents the type of a segment, as described in FIG. 9. A value representing that the segment is the END is set to the segment_type in the END.

The segment_length represents the length immediately after the field of this segment_length to the end of the segment (END).

Figure 16:
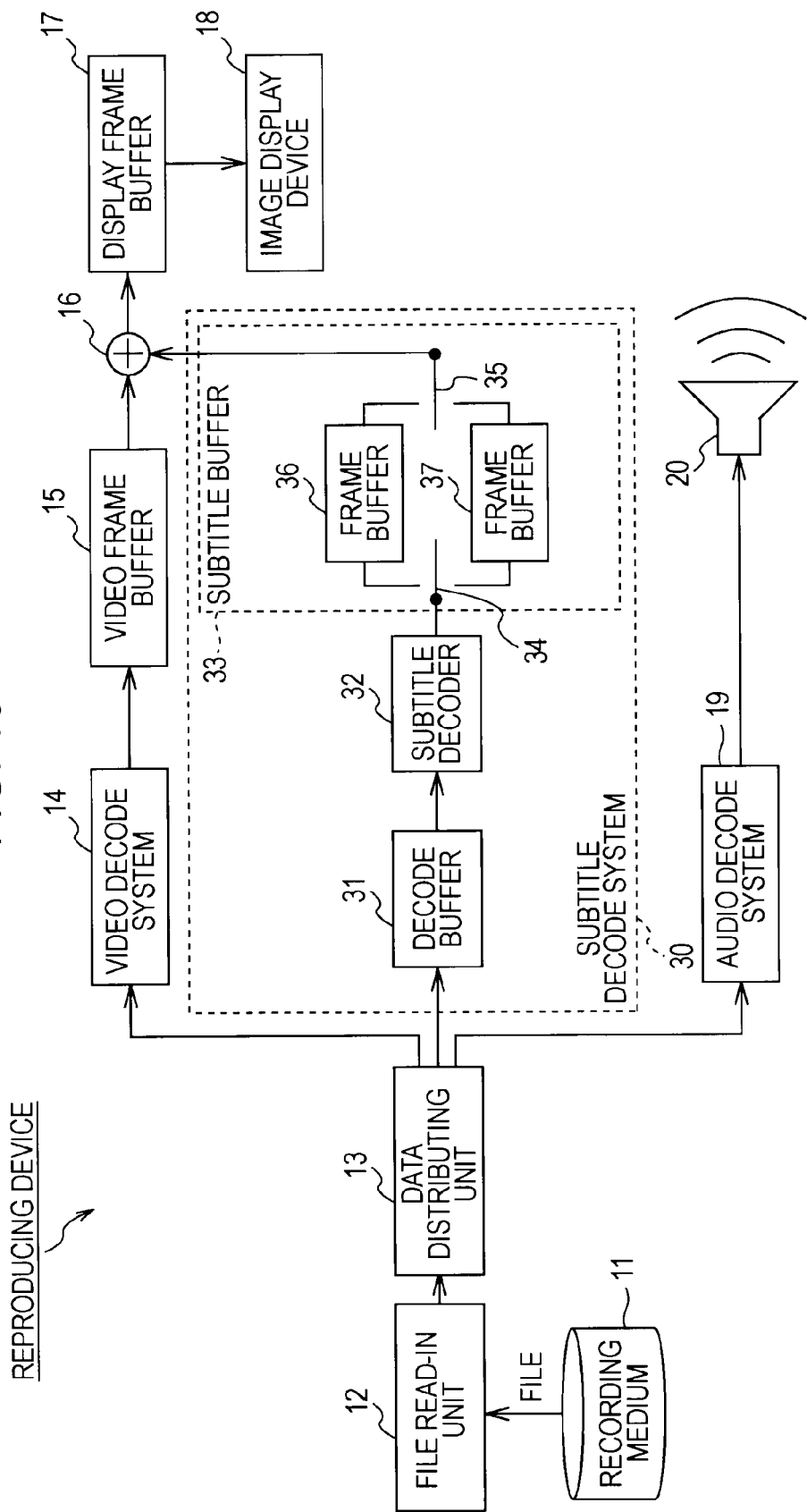
FIG. 16 is a block diagram illustrating a configuration example a reproducing device according to an embodiment.

FIG. 16 is a block diagram illustrating a configuration example of the reproducing device according to an embodiment of the present invention for reproducing a new-format file. In FIG. 16, the reproducing device is configured of a recording medium 11, file read-in unit 12, data distributing unit 13, video decode system 14, video frame buffer 15, synthesizing unit 16, display frame buffer 17, image display device 18, audio decode system 19, audio output device 20, and subtitle decode system 30.

A file in which a new-format stream is stored (new-format file) is recorded in the recording medium 11. Note that the recording medium 11 may be a recording medium which the reproducing device has built-in (including a recording medium detachable as to the reproducing device), or may be an external recording medium (including a recording medium over a network such as the Internet or the like).

The file read-in unit 12 reads in (receives) a new-format file recorded in the recording medium 11, for example, according to a user's operations or the like, and supplies this to the data distributing unit 13.

The data distributing unit 13 extracts moving picture data, and metadata for reproduction of the moving picture data thereof from the stream (FIG. 5) stored in the new-format file from the file read-in unit 12, and supplies (distributes) these to the video decode system 14.

Also, the data distributing unit 13 extracts audio data, and metadata for reproduction of the audio data thereof from the stream stored in the new-format file from the file read-in unit 12, and supplies these to the audio decode system 19.

Further, the data distributing unit 13 extracts subtitle data, and metadata for reproduction of the subtitle data thereof from the stream stored in the new-format file from the file read-in unit 12, and supplies these to the subtitle decode system 30.

The video decode system 14 follows the data from the data distributing unit 13 to perform decoding of the data thereof, thereby reproducing the image data of a moving picture (the image data of baseband) to supply this to the video frame buffer 15.

The video frame buffer 15 temporarily stores the image data of the moving picture from the video decode system 14, and supplies this to the synthesizing unit 16.

The synthesizing unit 16 synthesizes (superimposes) the image data of the subtitle supplied from the subtitle decode system 30 as to the image data of the moving picture from the video frame buffer 15, and supplies synthesized image data obtained as the synthesis results to the display frame buffer 17.

The display frame buffer 17 temporarily stores the synthesized image data from the synthesizing unit 16.

The image display device 18 is configured of a display such as an LCD (Liquid Crystal Display), organic EL (Electro Luminescence) panel, or the like, and displays the image corresponding to the synthesized image data stored in the display frame buffer 17.

The audio decode system 19 follows the data from the data distributing unit 13 to perform decoding of the data thereof, thereby reproducing the audio data to supply this to the audio output device 20.

The audio output device 20 is configured of an unshown amplifier, speaker, and so forth, subjects the audio data from the audio decode system 19 to certain processing, and outputs the audio corresponding to the audio obtained as a result thereof.

The subtitle decode system 30 is an example of a reproducing unit which follows subtitle data to reproduce the subtitle, and follows the data from the data distributing unit 13 to subjects the data thereof to decoding or the like, thereby reproducing the image data of a subtitle to supply this to the synthesizing unit 16.

Specifically, the subtitle decode system 30 is configured of a decode buffer 31, subtitle decoder 32, and subtitle buffer 33.

The decode buffer 31 temporarily stores the data supplied to the subtitle decode system 30 from the data distributing unit 13.

Specifically, a display set serving as subtitle data, and the data of the display start time of a subtitle (e.g., the time-to-sample atom of the ISO base media file format regarding the subtitle (FIG. 2A), etc.) serving as metadata, are supplied to the decode buffer 31 from the data distributing unit 13.

The decode buffer 31 temporarily stores the display set, the data of the display start time of the subtitle (display set) from the data distributing unit 13.

The subtitle decoder 32 reads out the display set stored in the decode buffer 31, follows the display set thereof to reproduce the image data (object) of the subtitle, thereby drawing this on the subtle buffer 33 of the subsequent stage.

Specifically, the subtitle decoder 32 decodes, for example, the encoded data stored in the encoded_data_string( ) included in the ODS (FIG. 14) of the display set read out from the decode buffer 31 to the image data (object) of the subtitle.

Further, the subtitle decoder 32 draws the image data of the subtitle in the position on the storage area of the subtitle buffer 33, determined with the color and transparency corresponding to the CLUT_entry( ) included in the CDS (FIG. 13) of the display set read out from the decode buffer 31, the object_horizontal_position and object_vertical_position included in the PCS (FIG. 9) of the display set thereof, and so forth.

The subtitle buffer 33 has, a so-called double buffer configuration, and temporarily stores the image data of the subtitle form the subtitle decoder 32 to supply this to the synthesizing unit 16.

Specifically, the subtitle buffer 33 is configured of two switches 34 and 35, and two frame buffers 36 and 37.

The switch 34 selects one of the frame buffers 36 and 37, and supplies the image data of the subtitle supplied to the subtitle buffer 33 from the subtitle decoder 32, to the selected frame buffer.

The switch 35 selects one of the frame buffers 36 and 37, and reads out the image data of the subtitle from the selected frame buffer to supply this to the synthesizing unit 16.

The frame buffers 36 and 37 are equivalent to the above-mentioned subtitled plane, and temporarily store the image data of the subtitle supplied from the switch 34.

Here, the switches 34 and 35 operate in an interlocking manner. Specifically, when the switch 35 selects one of the frame buffers 36 and 37, the switch 34 selects the other.

The switch 35 selects one of the frame buffers 36 and 37, whereby the image data of the subtitle is read out from the selected frame buffer, and is supplied to the image display device 18 through the switch 35, synthesizing unit 16, and display frame buffer 17, whereby the image (subtitle) corresponding to the image data of the subtitle stored in one of the frame buffers 36 and 37 is displayed on the image display device 18.

Simultaneously, the switch 34 selects the other of the frame buffers 36 and 37, whereby the image data of the subtitle to be displayed next on the image display device 18 is stored (drawn) in the selected other frame buffer.

Specifically, while (the subtitle serving as the image corresponding to) the image data of the subtitle stored in one of the frame buffers 36 and 37 is displayed on the image display device 18, updating of the storage content of the other of the frame buffers 36 and 37, i.e., drawing of the image data of the subtitle to be displayed next is performed.

Note that the switch 35 references the data of the display start time of the subtitle stored in the decode buffer 31, and upon the display start time of the image data of the subtitle stored in one of the frame buffers 36 and 37 coming, the switch 35 selects one of the frame buffers 36 and 37, and reads out the image data of the subtitle from the selected one to supply this to the synthesizing unit 16.

Upon the switch 35 selecting one of the frame buffers 36 and 37, as described above, the switch 34 selects the other of the frame buffers 36 and 37.

Also, upon the display start time of the image data of the subtitle stored in one of the frame buffers 36 and 37 coming, the subtitle decoder 32 reads out the display set of the subtitle to be displayed following the subtitle stored in one thereof from the decode buffer 31. Further, the subtitle decoder 32 follows the display set of the subtitle to be displayed next, read out from the decoder buffer 31 to start reproduction such as decoding or the like of the image data of the subtitle, and performs drawing of the image of the subtitle as to one of the frame buffers 36 and 37 selected by the switch 34.

The above-mentioned processing is repeated, whereby the subtitle is displayed in a manner superimposed on the moving picture on the image display device 18.

With the reproducing device configured as described above, moving picture processing (moving picture reproduction processing), audio processing (audio reproduction processing), and subtitle processing (subtitle reproduction processing) are performed.

Specifically, with the moving picture reproduction processing, the file read-in unit 12 reads out moving picture data, and metadata for reproduction of the moving picture data thereof from the new-format file stored in the recording medium 11 to supply these to the video decode system 14 through the data distributing unit 13.

The video decode system 14 performs decoding of the data supplied through the data distributing unit 13, or the like, thereby reproducing the image data of the moving picture to supply this to the synthesizing unit 16 through the video frame buffer 15.

The synthesizing unit 16 synthesizes (superimposes) the image data of the subtitle supplied from the subtitle decode system 30 on the image data of the moving picture supplied through the video frame buffer 15 by later-described subtitle reproduction processing being performed, and supplies the synthesized image data obtained as the synthesis results to the image display device 18 through the display frame buffer 17.

With the image display device 18, in accordance with the synthesized image data supplied through the display frame buffer 17, the image corresponding to the synthesized image data is displayed.

On the other hand, with the audio reproduction processing, the file read-in unit 12 reads out audio data, and metadata for reproduction of the audio data thereof from the new-format file recorded in the recording medium 11 to supply these to the audio decode system 19 through the data distributing unit 13.

The audio decode system 19 performs decoding of the data supplied through the data distributing unit 13, or the like, thereby reproducing the audio data to supply this to the audio output device 20.

With the audio output device 20, the audio corresponding the audio data from the audio decode system 19 is output (emitted).

Also, with the subtitle reproduction processing, the file read-in unit 12 reads out subtitle data, and metadata for reproduction of the subtitle data thereof from the new-format file recorded in the recording medium 11 to supply these to the subtitle decode system 30 through the data distributing unit 13.

The subtitle decode system 30 performs decoding of the data supplied through the data distributing unit 13, or the like, thereby reproducing the image data of the subtitle to supply these to the synthesizing unit 16.

As described above, with the synthesizing unit 16, the image date of the subtitle supplied from the subtitle decode system 30 is synthesized on the image data of the moving picture from the video frame buffer 15, and the synthesized image data is supplied to the image display device 18 through the display frame buffer 17.

With the image display device 18, the image corresponding to the synthesized image data is displayed, and thus, the subtitle is displayed in a manner superimposed on the moving picture.

Figure 17:
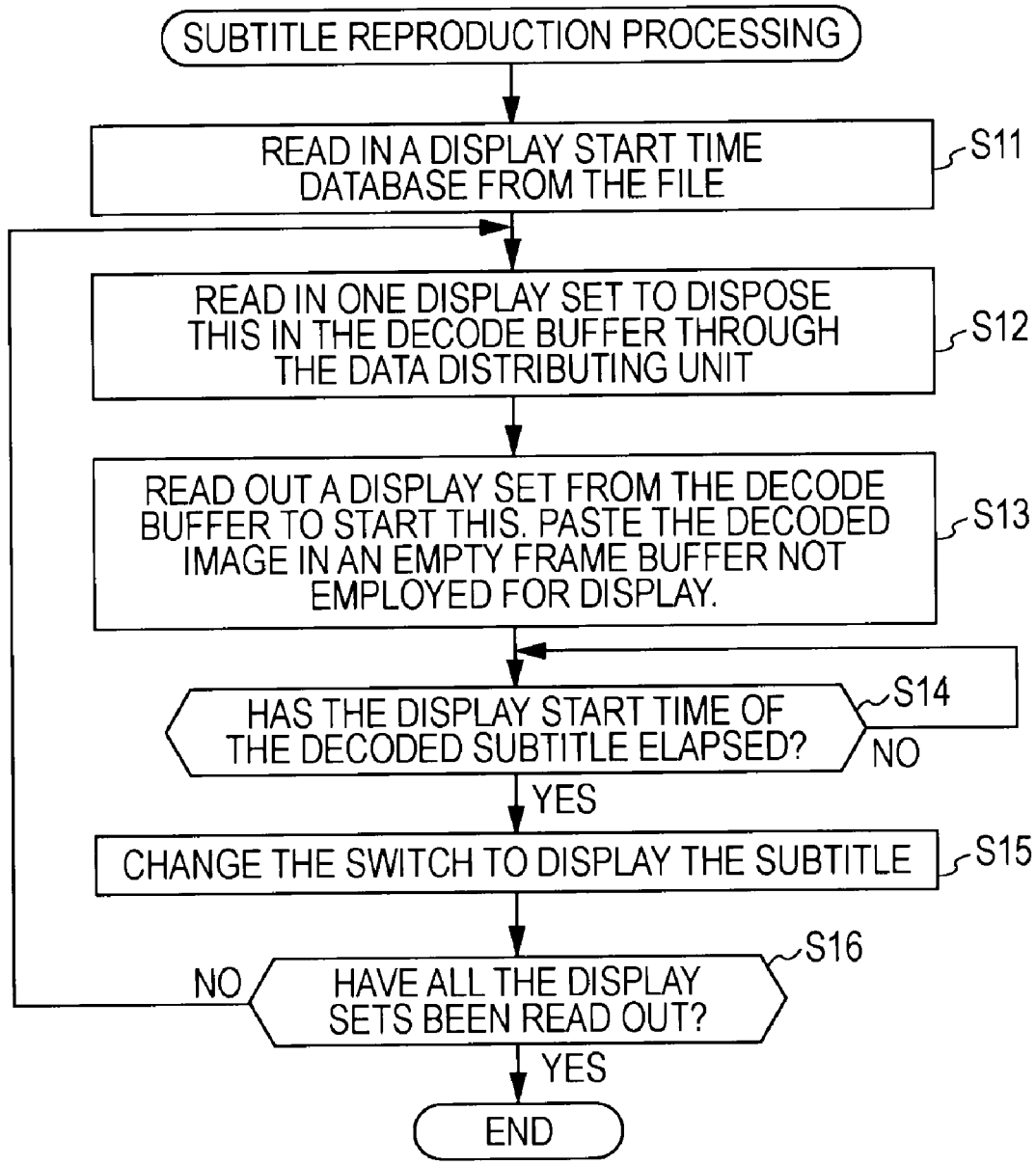
FIG. 17 is a flowchart describing subtitle reproduction processing.

FIG. 17 is a flowchart describing the subtitle reproduction processing by the reproducing device in FIG. 16.

In step S11, the file read-in unit 12 reads out the data of the display start time of a subtitle serving as metadata for reproduction of the subtitle data from the new-format file recorded in the recording medium 11 to supply this to the decode buffer 31 of the subtitle decode system 30 through the data distributing unit 13.

The decode buffer 31 stores the data of the display start time of the subtitle supplied through the data distributing unit 13, and the processing proceeds to step S12 from step S11.

In step S12, the file read-in unit 12 reads out one display set from the new-format file recorded in the recording medium 11 to supply this to the decode buffer 31 of the subtitle decode system 30 through the data distributing unit 13.

Specifically, the file read-in unit 12 reads out, for example, of the display sets which have not been read out, recorded in the new-format file, one display set of which the order recording to the file is the earliest, and supplies this to the decode buffer 31 of the subtitle decode system 30 through the data distributing unit 13.

The decode buffer 31 temporarily stores the display set supplied through the data distributing unit 13, and the processing proceeds to step S13 from step S12.

In step S13, the subtitle decoder 32 reads out the display set stored in the decode buffer 31, and reproduces the image data of the subtitle to draw this on the subtitle buffer 33 in accordance with the display set thereof.

Specifically, the subtitle decoder 32 decodes the display set read out from the decode buffer 31 to the image of the subtitle.

Further, the subtitle decoder 32 draws (pastes) the image data of the subtitle on one (not employed for display) of the frame buffers 36 and 37 of the subtitle buffer 33 selected by the switch 34.

Subsequently, the processing proceeds to step S14 from step S13, where the subtitle decode system 30 determines whether or not the display start time of the image data of the subtitle drawn in the last step S13 has come.

In a case where determination is made in step S14 that the display start time of the subtitle drawn in the last step S13 (hereafter, also referred to as "the latest subtitle") has not come, the processing returns to step S14.

Also, in a case where determination is made in step S14 that the display start time of the latest subtitle has come, the processing proceeds to step S15, where the switch 35 selects one of the frame buffers 36 and 37 of the subtitle buffer 33 in which the image data of the latest subtitle is stored (drawn).

Note that, at this time, the switch 34 selects one of the frame buffers 36 and 37 which is not selected by the switch 35.

Of the frame buffers 36 and 37, the image data of the latest subtitle is read out from one selected by the switch 35, and is supplied to the synthesizing unit 16.

With the synthesizing unit 16, the image date of the latest subtitle supplied from the switch 35 of the subtitle decode system 30 is synthesized on the image data of the moving picture from the video frame buffer 15, and the image corresponding to the synthesized image data obtained as a result thereof is displayed on the image display device 18. That is to say, the latest subtitle is displayed in a manner superimposed on the moving picture.

Subsequently, the processing proceeds to step S16 from step S15, where the file read-in unit 12 determines whether or not all of the display sets have been read out from the new-format file recorded in the recording medium 11.

In a case where determination is made in step S16 that all of the display sets have not been read out from the new-format file, i.e., in a case where there is a display set which has not been read out, the processing returns to step S12, where the file read-in unit 12 reads out, as described above, one display set of the display sets which have not been read out, i.e., reads out the display set following the display set of the latest subtitle, and supplies this to the decode buffer 31 through the data distributing unit 13.

The decode buffer 31 temporarily stores the display set supplied through the data distributing unit 13, and the processing proceeds to step S13 from step S12.

In step S13, the subtitle decoder 32 reads out the display set stored in the decode buffer 31 (the display set following the latest subtitle display set), and in accordance with the display set thereof, reproduces the image data of the subtitle to draw this on one of the frame buffers 36 and 37 selected by the switch 34. Hereafter, the same processing is repeated.

On the other hand, in a case where determination is made in step S16 that all of the display sets have been read out from the new-format file, the subtitle reproduction processing ends.

As described above, with the subtitle decode system 30, when the display start time of the latest subtitle comes, of the frame buffers 36 and 37, one storing the image data of the latest subtitle is selected at the switch 35, and thus, the latest subtitle is displayed in a manner superimposed on the moving picture with the image display device 18.

Further, when the display start time of the latest subtitle comes, with the subtitle decoder 32, reproduction of the display set following the display set of the latest subtitle is started, and the image data of the subtitle obtained by the reproduction thereof is drawn on one of the frame buffers 36 and 37, selected by the switch 34.

As described above, the switches 34 and 35 operate in an interlocking manner, wherein when the switch 35 selects one of the frame buffers 36 and 37, the switch 34 selects the other.

Accordingly, when the switch 35 selects, of the frame buffers 36 and 37, one storing the image data of the latest subtitle, and thus, the latest subtitle is displayed on the image display device 18, with the switch 34, of the frame buffers 36 and 37, one not storing the image data of the latest subtitle is selected, and the image data of the next subtitle reproduced by the subtitle decoder 32 (the image data of the subtitle of the display set following the display set of the latest subtitle) is drawn on the one selected by the switch 34.

As described above, with the subtitle decode system 30, the display start time of (the subtitle of) a certain display set is deemed as the decode start time (reproduction start time) for starting reproduction such as decoding or the like of a display set to be displayed next, and thus, display sets are reproduced sequentially. Specifically, when the display start time of a certain display set comes, display of the subtitle of the display set thereof is started, and simultaneously therewith, the display set (of a subtitle) to be displayed next is read in from the file, and reproduction thereof is started.

Note that, with regard to the first display set (display set to be displayed first), there is no last display set thereof, and accordingly, upon the first display set being read out from the file, and being stored in the decode buffer 31, the subtitle decoder 32 immediately starts reproduction thereof.

Also, with regard to a display set during a non-display section, i.e., a display set wherein the number_of_region_composition_objects in the PCS (FIG. 9) is 0, or a display set wherein the T-value in the CDS (FIG. 13) is 0, in step S13 the subtitle decoder 32 follows the display set thereof to reproduce the image data with no subtitle, or the image data of a completely transparent subtitle. Thus, the subtitle is hidden.

As described above, with a section where display of a subtitle is constant as display units of subtitles, subtitle data is classified into display sets each of which is subtitle data in display units, and also the number_of_region_composition_objects serving as the number-of-subtitles information representing the number of subtitles to be displayed on one screen, and the T-value serving as the transparency information representing the transparency of a subtitle are included in a display set, and with regard to a display set during a non-display section whereby a subtitle is hidden, the number_of_region_composition_objects is set to 0, or the T-value is set to 0 to hide the subtitle, and the subtitle data is stored in a file conforming to the ISO base media file format or MP4 file format (so as to display the subtitle appropriately), whereby display of the subtitle can be performed appropriately (display of the subtitle which a file (content) creator intends) from the file storing the subtitle data thereof.

Note that the data structure of the subtitle data in a new format consults the subtitled stream of the DVB (Digital Video Broadcasting).

Specifically, as shown in FIG. 6, subtitle data is stored in the new-format file by employing a hierarchical structure made up of three hierarchies of, from the top hierarchy, epoch, display set, and segment, which is common to the subtitled stream of the DVB.

Also, such as described in FIG. 6, subtitle data is made up of an array of one or more epochs, one epoch is made up of an array of one or more display segments, and a display set is made up of segments, which are generally common to the epochs, display sets, and segments of the DVB.

However, the subtitled stream of the DVB is not stored in a file conforming to the ISO base media file format (true for the MP4 file format) without modification.

On the other hand, the data structure of the subtitle data in a new format differs from the subtitled stream of the DVB regarding the content (syntax) of each of the segments described in FIGS. 9, 11, 13, and others, the type of display set described in FIG. 10, and so forth so as to be stored in a file conforming to the ISO base media file format.

Further, the data structure of the subtitle data in a new format differs from the subtitled stream of the DVB in that one display set corresponds to one sample of the ISO base media file format. This is also for storing the subtitle data in a file conforming to the ISO base media file format.

Note that the subtitled stream of the DVB is described in, for example, ETSI EN 300 743, Digital Video Broadcasting (DVB); Subtitling systems.

Next, as described above, in a case where the subtitle data is stored in a file confirming to the ISO base media file format or the like as a display set, if decode start time for starting reproduction such as decoding or the like of (the subtitle of) the display set thereof, and display start time for starting display can be stored in the file along with the metadata, with the subtitle decode system 30 (FIG. 16), it is desirable to start reproduction such as decoding or the like of a display set at the decode start time, and start display of a subtitle at the display start time.

However, with the ISO base media file format (true for the MP4 file format), the display start time can be managed as metadata, but a method for managing the decode start time, and further time for reproduction such as decoding or the like (decode time) is not defined.

Note that, for example, the DTS (Decode Time Stamp) of a MPEG2 video is the decode start time, but with the MPEG2 video, there is a picture wherein DTS and PTS (Present Time Stamp) are matched, so decode time itself for decoding of a picture is deemed to be 0 on a decoder model. Here, the difference between DTS and PTS is time used for reordering of a B picture (Bidirectionally Predictive Picture), and decode time itself is not taken into consideration.

In a case where a display set is stored in the ISO base media file format as subtitle data, as described above, the display start time (of the subtitle) of the display set can be managed, but the decode start time for starting reproduction such as decoding or the like of the display set, and time for reproduction such as decoding or the like is not managed.

Accordingly, upon a display set being stored in the ISO base made file format without taking the processing time into consideration, an inconvenience is caused in that reproduction of the display set is not in time for the display start time of the display set thereof, and accordingly, a subtitle is not displayed appropriately (display of a subtitle fails).

That is to say, with the reproducing device in FIG. 16, the display start time of a display set can be recognized from the metadata stored in the new-format file. However, the reproducing device does not recognize from when reproduction should be started in order that reproduction of the display set may be in time for the display start time thereof.

Therefore, with the reproducing device in FIG. 16, for example, as described above, as the decode start time of a display set the display start time of the display set immediately before the display set thereof is employed, when the display start time of a certain display set comes, reproduction, such as decoding or the like of the next display set (the display set of a subtitle to be displayed next), is started.

However, in a case where a display set is stored in the new-format file without considering the time for reproduction such as decoding or the like of the display set, reproduction such as decoding or the like of the next display set is not unexceptionally completed from the display start time of a certain display set to the display start time of the next display set, and there is a possibility that reproduction of a subtitle may not be in time for display of the subtitle thereof.

Therefore, description will be made below regarding a method wherein, with a generating device for generating a new-format file by storing a display set in the ISO base media file format, by imposing a certain constraint on generation of the file thereof (hereafter, also referred to as "file generation constraint"), reproduction of a subtitle from the file thereof is performed so as to be in time for display of the subtitle thereof.

Note that, as for the reproducing device for reproducing the new-format file, it is premised on employing the reproducing device in FIG. 16, i.e., the reproducing device including only the one subtitle decoder 32 for performing decoding of a display set (reproducing device which can perform decoding of one display set alone, but does not perform decoding of multiple display sets simultaneously).

The reproducing device in FIG. 16 includes the one subtitle decoder 32 alone, so in order that reproduction of a subtitle is in time for display thereof, there are two conditions wherein, as for the first condition, decode time necessary for decoding of a certain display set is not overlapped with the decode time of another display set, and as for the second condition, decode completion time when decoding of a display set by the subtitle decoder 32 is completed is time before the display start time of the display set thereof.

Tentatively, with a new-format file, in the event that the display start time and decode start time of a display set can be managed (stored), a file in which a display set is stored is generated at the generating device so as to satisfy the first and second conditions, whereby reproduction of a subtitle can be in time for display thereof at the reproducing device.

Specifically, in this case, with the reproducing device, reproduction such as decoding or the like of a display set is started at the decode start time with the new-format file, and display is started at the display start time, whereby reproduction of a subtitle can be in time for display thereof.

Figure 18:
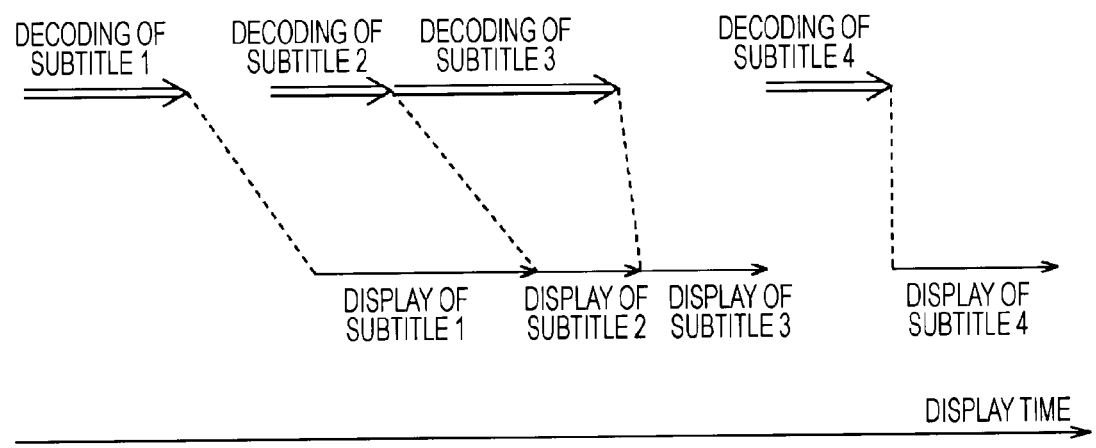
FIG. 18 is a diagram illustrating the sequence of reproduction and display of a display set.

FIG. 18 illustrates the reproduction and display sequences of display sets, performed from a file generated so as to satisfy the first and second conditions. With the reproducing device, when the decode start time comes, reproduction such as decoding or the like of a display set is started. Subsequently, when the display start time comes, display (the subtitle) of the display set is started.

The decode start time and display start time satisfy the first and second conditions, so with the reproducing device, as described above, reproduction and display of a display set are performed in accordance with the decode start time and display start time, respectively, whereby reproduction of a subtitle can be in time for display thereof.

Incidentally, time for reproduction of a display set is almost equal to the time for decoding. The time for decoding, and consequently, the time used, depends on various factors, such as the encoding method of subtitled encoded data (encoded_data_string( ) (FIG. 14)), the size of a subtitle (the number of pixels), the number of subtitle colors, complexity of (the image of) a subtitle, frame rate of a moving picture on which a subtitle is superimposed, resolution, and so forth, so differs for every display set (sample).

With the generating device, in the event that according to such time used which depends on various factors, and differs for every display set, processing for determining the decode start time and display start time satisfying the first and second conditions is performed, the processing load thereof increases greatly.

Note that the display start time is generally determined at the time of content creation, so substantially, with the generating device, the decode start time satisfying the first and second conditions is determined.

Also, for the reproducing device for reproducing a new-format file wherein subtitle data is stored in a file conforming to the ISO base media file format, such as described above, a decoder model which has to have the decode start time of a sample is not adapted thereto.

Specifically, with the ISO base media file format, the display start time of a display set which is a sample can be obtained by the duration (sample duration) of the time-to-sample atom (FIG. 2A) serving as metadata, but there is no method for representing the decode start time of a sample.

Therefore, even if the decode start time and display start time satisfying the first and second conditions are determined at the generating device, the reproducing device for reproducing the new-format file does not recognize the decode start time determined at the generating device.

Accordingly, it is not desirable to impose determining the decode start time and display start time satisfying the first and second conditions as file generation constraints.

Therefore, in order to prevent the processing load of the generating device from increasing greatly, and facilitate the reproducing device for reproducing a new-format file whereby reproduction of a subtitle is in time for display thereof, the following rules R1 through R6 will be employed as file generation constraints.

The rule R1 is to set the decode (reproduction) start time for starting reproduction such as decoding or the like of a display set, and the display start time for starting display of the display set of the subtitle to be displayed immediately before, identically.

The rule R2 is to take, when paying notice to a certain display set, the time from the display start time of the display set to be displayed (the last display set) immediately before the display set of interest thereof (display set of interest) until the display start time of the display set of interest (time between the display start time of the last display set and the display start time of the display set of interest) as available time T which is available for reproduction of the display set of interest.

The rule R3 is employed instead of the Rule R2 in a case where the last display set is a display set during a non-display section, and is to take the time from the display start time of the display set to be displayed further immediately before the display set to be displayed immediately before the display set of interest until the display start time of the display set of interest as available time T of the display set of interest.

The rule R4 is, with the time $T_{min}$ for reproduction such as decoding or the like of the display set of interest as the minimum value of the available time T of the display set of interest, to prevent the available time T from being less than the time $T_{min}$.

According to the rule R4, the available time T of the display set of interest is at or above the time $T_{min}$, whereby assuring that reproduction such as decoding or the like of the display set of interest is completed during the available time T, i.e., that reproduction of the display set of interest is completed until the display start time thereof.

Accordingly, reproduction of the display set of interest can be performed so as to be in time for display thereof. Further, before reproduction such as decoding or the like of the display set of interest is completed, the display start time of the display set of interest, i.e., the decode start time of the display set following the display set of interest comes, whereby the processing of reproduction such as decoding or the like of the display set can be prevented from failing.

Note that, if we say that the display start time interval between consecutive two display sets is taken as a display set interval, the available time T becomes a display set interval as a general rule. Also, the time $T_{min}$ is the minimum value of display set intervals to assure that reproduction of a display set is performed so as to be in time for display thereof.

According to the rule R4, regarding where to dispose a certain display set on the display time axis is constrained with not a parameter relating to the display set thereof itself, but the display time (display set interval) of the last display set (in a case where the rule R3 is applied, the display set to be displayed further immediately before the last display set).

The rule R5 is to assume that the time $T_{min}$ of the display set of interest depends on only the encoded data (encoded_data_string( ) (FIG. 14)) of the display set of interest.

Specifically, in reality, the time $T_{min}$ of a display set receives influence of various factors such as an encoding method for encoding (the image data of) a subtitle into encoded data, the size of the image data of a subtitle, the size (of the image) of a subtitle (the number of horizontal pixels× the number of vertical pixels), the number of subtitle colors, complexity (of the image) of a subtitle, the shape of a subtitle (whether a subtitle is landscape or portrait, etc.), the display position where a subtitle is displayed, and further, the frame rate of a moving picture where a subtitle is superimposed, scan type (interlace or progressive), bit rate (peak rate and average rate), and so forth.

In a case where the time $T_{min}$ is obtained while considering such all various factors, an accurate value can be obtained as the time $T_{min}$, but on the other hand, the load of processing for obtaining the time $T_{min}$ increases.

Also, in order to obtain the time $T_{min}$ while considering such all various factors, for example, a function (model) for outputting the time $T_{min}$ having an accurate value has to be obtained with such various factors as arguments, but it is difficult to obtain such a function.

To this end, the rule R5 assuming that the time $T_{min}$ of the display set of interest depends on only the encoded data of the display set of interest is employed, whereby the time $T_{min}$ can be readily obtained.

The rule R6 is not to apply the rules R1 through R5 in a case where the display set of interest is a display set to be displayed first of the stream.

Specifically, the display set of a subtitle to be displayed over the whole display section of a moving picture is stored in the new-format file, so the display start time of a display set to be displayed first agrees (has to agree) with the time when display of the moving picture is started.

Subsequently, the time of a display set to be displayed first is included in so-called startup delay, so originally, reproduction of a display set is in time for display thereof, and accordingly, the file generation constraints do not have to be imposed.

The rule R6 is applied to, for example, the display set #1 to be displayed first in FIG. 4. The display set #1 in FIG. 4 is a display set during a non-display section, but the rule R6 is also applied to a display set during a section other than a non-display section (display section).

Description will be made further regarding the rules R1 through R3 with reference to FIGS. 19A and 19B. Note that, hereafter, the display set of interest will also be referred to as the current Display Set, and the last display set will also be referred to as the preceding Display Set.

Figure 19A:
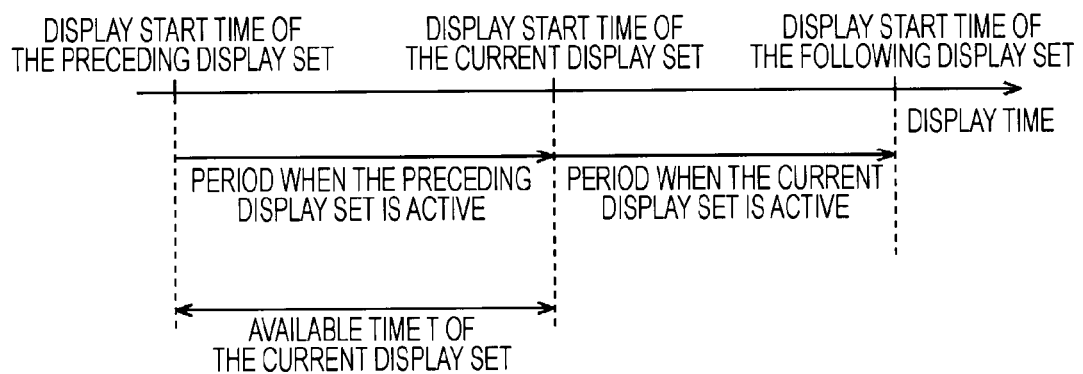
FIGS. 19A and 19B are diagrams for describing rules R1 and R3.

FIG. 19A illustrates, in a case where the preceding Display Set is not a display set during a non-display section, an array of the preceding Display Set, and current Display Set.

The (subtitle of the) current Display Set is displayed from the display start time of the current Display Set until the display start time of a display set to be displayed next (following display set). The time from the display start time of the current Display Set until the display start time of the following display set will be referred to as time (period) when the current Display Set is active.

The preceding Display Set is displayed for the time from the display start time of the preceding Display Set until the display start time of the current Display Set, so this time is time when the preceding Display Set is active.

When it is premised on reproduction of a display set being performed so as to be in time for display thereof, the rule R1, i.e., the rule setting the decode start time of a display set and the display start time of the last display set to the same is equivalent to performing modeling assuming that time for reproduction such as decoding or the like of the current Display Set is at or below time when the preceding Display Set is active.

Specifically, in the even that reproduction of a display set has been performed so as to be in time for display thereof, and at the display start time of the preceding Display Set, reproduction of the preceding Display Set thereof has had to be completed.

Accordingly, at the display start time of the preceding Display Set, the subtitle decoder 32 (FIG. 16) can start decoding of the current Display Set which is the next display set. Subsequently, reproduction such as decoding or the like of the current Display Set has had to be completed until the display start time of the current Display Set, i.e., while the preceding Display Set is active.

Note that in a case where reproduction of the current Display Set has been completed before the display start time thereof, the subtitle decoder 32 is in an idle state (waiting for data) (a state waiting for start of decoding of the following display set) after completion of reproduction of the current Display Set until the display start time thereof.

The rule R2 is a rule derived from the rule R1. Specifically, according to the rule R1, reproduction of the current Display Set has had to be completed from the display start time of the preceding Display Set while the preceding Display Set is active.

Accordingly, the available time T available for reproduction of the current Display Set comes to the time when the preceding Display Set is active (time between the display start time of the preceding display set and the display start time of the current Display Set), and accordingly, the rule R2 is derived.

Figure 19B:
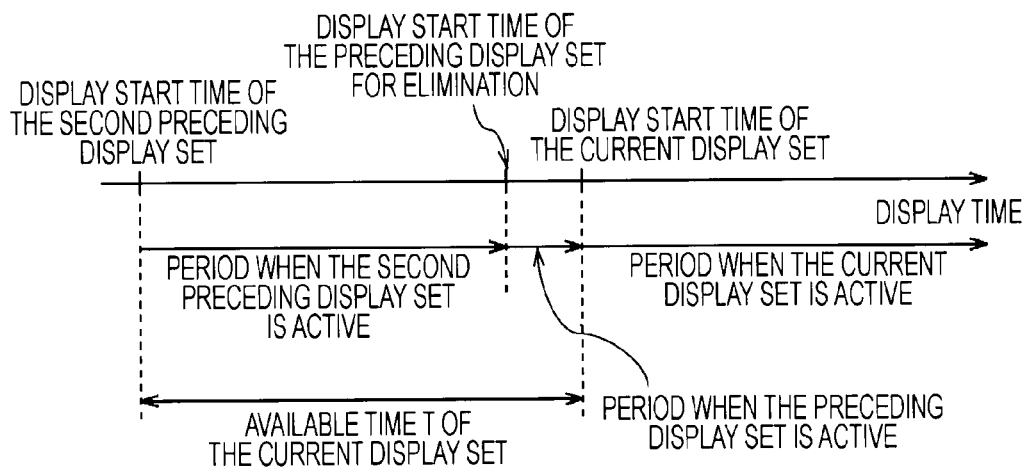

FIG. 19B is a diagram describing the rule R3. Now, let us say that, of three display sets which are displayed consecutively, the display set to be displayed last is the current Display Set.

In this case, of the three display sets which are displayed consecutively, the display set to be displayed second is the preceding Display Set.

Now, of the three display sets which are displayed consecutively, the display set to be displayed first, i.e., the display set immediately before the preceding display set will be referred to as the second preceding Display Set.

Now, let us say that the preceding Display Set is a display set during a non-display section, i.e., a display set only for eliminating (the subtitle of) the second preceding Display Set.

The preceding Display Set is a display set during a non-display section, so there is no encoded data (encoded_data_string( ) (FIG. 14)) to be decoded at the subtitle decoder 32 (encoded data does not have to be decoded).

Accordingly, the subtitle decoder 32 does not have to decode the preceding Display Set at time when the second preceding Display Set is active. Thus, the subtitle decoder 32 can start decoding of the current Display Set not at the display start time of the preceding Display Set but at the display start time of the second preceding Display Set.

Thus, the available time T available for reproduction of the current Display Set becomes time between the display start time of the second preceding Display Set and the display start time of the current Display Set.

Specifically, in a case where the last display set is a display set during a non-display section, the rule R3 is derived which takes the time from the display start time of the display set to be displayed further immediately before the display set to be displayed (display set during a non-display section) immediately before the display set of interest as the available time T of the display set of interest.

Now, let us say that, in a case where the preceding Display Set is a display set during a non-display section, the second preceding Display Set is not a display set during a non-display section.

Tentatively, in a case where consecutive two display sets are both display sets during a non-display section, the two display sets can be integrated to one display set during a non-display section. Thus, such display sets are integrated, whereby, in a case where the preceding display set is a display set during a non-display section, the second preceding Display Set is a display set which is not a display set during a non-display section.

Next, description will be made regarding how to obtain the time $T_{min}$ according to the rule R5, with reference to FIG. 20.

The time $T_{min}$ for reproduction of a display set is deemed to be time for decoding of encoded data. However, as described above, the time for decoding of encoded data depends on various factors, so it is difficult to perform modeling accurately.

With the rule R5, the time $T_{min}$ of the display set of interest is deemed to depend on only the size of the encoded data (encoded_data_string( ) (FIG. 14)) of the display set of interest, and thus, modeling of the time $T_{min}$ can be readily performed.

According to the rule R5, the time $T_{min}$ of a display set is represented with Expression $T_{min}=F(s)$ according a function F(s) with the size s of the encoded data of the display set thereof as an argument, and with modeling, the function F(s) is obtained.

The function F(s) depends on the specification of the subtitle decode system 30 (FIG. 16), and particularly, the performance of the subtitle decoder 32.

FIG. 20 illustrates the function F(s) obtained by simulation regarding the subtitle decoder 32 having certain performance. The function F(s) outputs the time $T_{min}$ with the size s of the encoded data as an argument, so we can say that the function F(s) represents size-time relationship which is the relation between the size s of the encoded data and the time $T_{min}$. In FIG. 20, the horizontal axis represents the size s of the encoded data with bytes as units, and the vertical axis represents the time $T_{min}$ with the number of frames of a moving picture (video frames) as units.

Note that timing when display of (the subtitle of) a display set is started is matched (has to be matched) with timing when a frame of a moving picture on which a subtitle is superimposed is displayed, and accordingly, in FIG. 20, the number of frames are taken as the units of the time $T_{min}$ on the vertical axis.

Also, the size s of the encoded data on the horizontal axis is the byte size of the encoded_data_string( ) stored in the ODS (FIG. 14).

According to a simulation, it has been confirmed that the greater the size s of the encoded data is, the greater the time $T_{min}$ is, and FIG. 20 illustrates size-time relationship created based on the results of the simulation thereof.

Note that with the size-time relationship in FIG. 20, the value of the time $T_{min}$ becomes a value obtained by adding a so-called margin to the value obtained at the simulation such that reproduction of a display set is in time for display thereof in a sure manner. The margin can be determined while considering certainty that reproduction of a display set is in time for display thereof.

Figure 21:
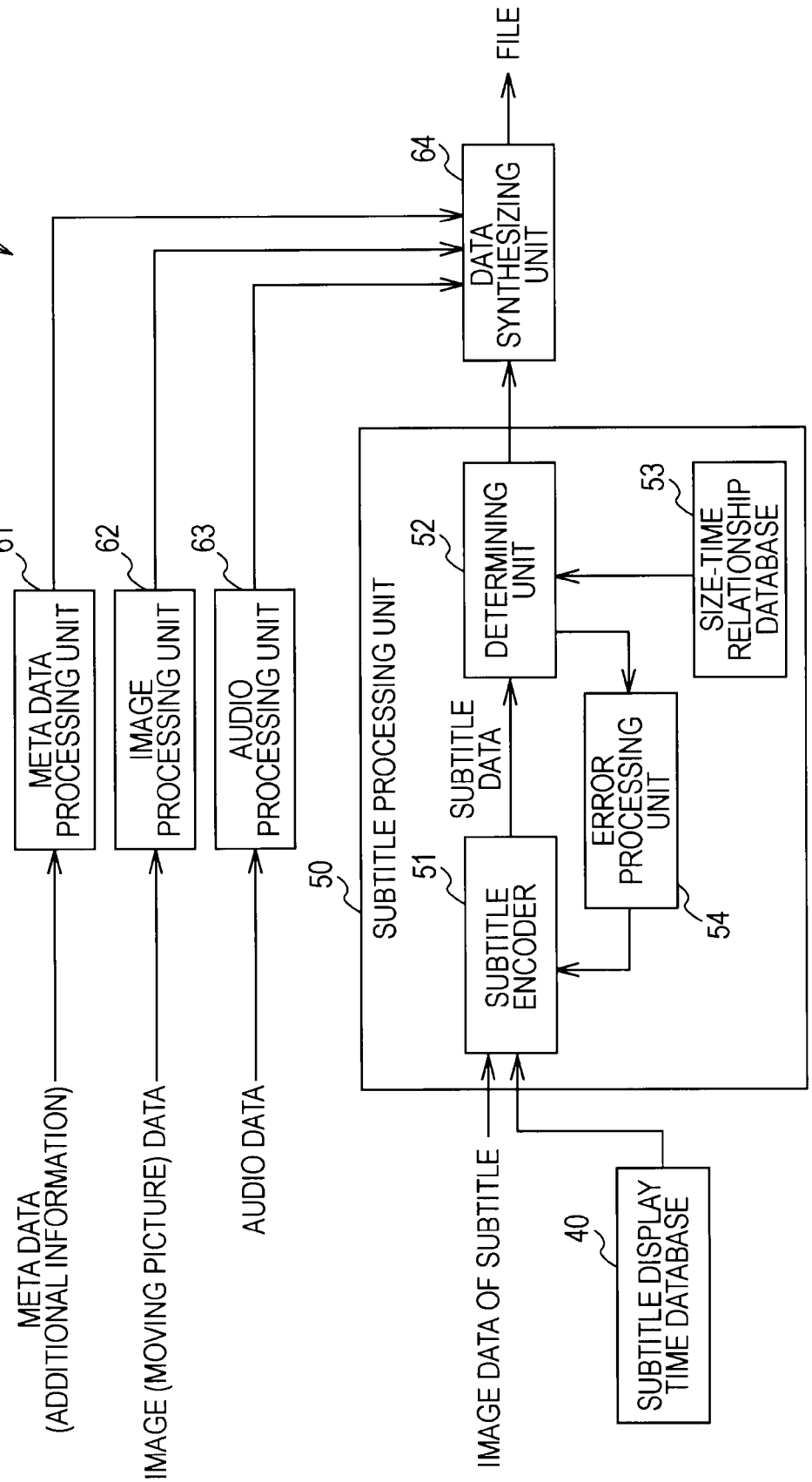
FIG. 21 is a block diagram illustrating a configuration example of a generating device according to an embodiment.

FIG. 21 is a block diagram illustrating a configuration example of the generating device according to an embodiment for generating a new-format file in accordance with the above-mentioned rules R1 through R6.

The generating device is configured of a subtitle display time database 40, subtitle processing unit 50, metadata processing unit 61, image processing unit 62, audio processing unit 63, and data synthesizing unit 64.

The subtitle display time database 40 stores the display start time of a subtitle. Here, the display start time of a subtitle is determined beforehand, for example, by a creator or the like who creates a file (content) by employing the generating device in FIG. 21.

The image data of a subtitle is supplied to the subtitle processing unit 50. The subtitle processing unit 50 processes the image data of a subtitle supplied thereto to generate a subtitle sample, i.e., a display set, and supplies this to the data synthesizing unit 64.

Specifically, the subtitle processing unit 50 is configured of a subtitle encoder 51, determining unit 52, size-time relationship database 53, and error processing unit 54. For example, one sheet (screen worth) of bitmap data serving as the image data of a subtitle is supplied to the subtitle encoder 51 as appropriate.

The subtitle encoder 51 encodes the image data of a subtitle supplied thereto to generate subtitle data to be stored in the new-format file, and supplies this to the determining unit 52. Specifically, the subtitle encoder 51 encodes the image data of a subtitle to be supplied thereto, thereby generating encoded data (encoded_data_string( ) (FIG. 14)). Subsequently, the subtitle encoder 51 employs the encoded data thereof to generate a display set which is a subtitle sample, and supplies this to the determining unit 52 as a display set of interest.

Further, the subtitle encoder 51 obtains the available time T of the display set of interest by referencing the display start time of the subtitle (display set) stored in the subtitle display time database 40, and supplies this to the determining unit 52.

Note that, in a case where the display set generated at the subtitle encoder 51 is a display set during a non-display section, the necessity of the encoded data can be eliminated.

The determining unit 52 detects the size s of the encoded data included in the display set of interest from the subtitle encoder 51. Further, the determining unit 52 determines whether or not reproduction of the display set of interest by the reproducing device in FIG. 16 is in time for display thereof, based on the size s of the encoded data included in the display set of interest.

Specifically, the determining unit 52 obtains the time $T_{min}$ regarding the display set of interest from the size s of the encoded data included in the display set of interest in accordance with the function F(s) (FIG. 20) serving as the size-time relationship stored in the size-time relationship database 53.

Further, the determining unit 52 obtains the magnitude correlation between the available time T of the display set of interest, and the time $T_{min}$ obtained from the size s of encoded data included in the display set of interest, and determines whether or not reproduction of the display set of interest is in time for display thereof, based on the magnitude correlation thereof.

Specifically, in a case where the available time T of the display set of interest is at or above the time $T_{min}$, the determining unit 52 determines that reproduction of the display set of interest is in time for display thereof. Also, in a case where the available time T of the display set of interest is below the time $T_{min}$, the determining unit 52 determines that reproduction of the display set of interest is not in time for display thereof.

In the case of determining that reproduction of the display set of interest is in time for display thereof, the determining unit 52 supplies the display set of interest to the data synthesizing unit 64.

Also, in the case of determining that reproduction of the display set of interest is not in time for display thereof, the determining unit 52 outputs error information representing an error.

As described in FIG. 20, the size-time relationship database 53 stores the function F(s) serving as size-time relationship obtained beforehand.

The error processing unit 54 performs error processing for realizing that reproduction of the display set of interest is in time for display thereof in accordance with the output of error information by the determining unit 52.

Specifically, for example, upon the determining unit 52 outputting error information, the error processing unit 54 performs, for example, processing for increasing the available time T of the display set of interest as error processing.

Here, the error processing unit 54 increases the available time T of the display set of interest, for example, by delaying the display start time of the display set of interest, or by accelerating the display start time of the display set immediately before the display set of interest.

Specifically, the error processing unit 54 supplies a control signal for instructing to delay the display start time of the display set of interest, or to move up the display start time of the display set immediately before the display set of interest, to the subtitle encoder 51.

In a case where the control signal is supplied from the error processing unit 54, the subtitle encoder 51 performs time adjustment for delaying the display start time of the display set of interest, or accelerating the display start time of the display set immediately before the display set of interest in accordance with the control signal thereof. Further, the subtitle encoder 51 employs the display start time after the time adjustment to obtain the available time T of the display set of interest again, and supplies this to the determining unit 52.

Here, as described above, the time adjustment for delaying the display start time of the display set of interest, or accelerating the display start time of the display set immediately before the display set of interest is performed, whereby the available time T of the display set of interest can be increased.

However, in the case of delaying the display start time of the display set of interest, the available time T of the display set following the display set of interest becomes short. Also, in the case of accelerating the display start time of the display set immediately before the display set of interest is performed, the available time T of the display set immediately before the display set of interest becomes short.

In a case where the available time T of the display set following the display set of interest becomes short, and thus, the available time T thereof becomes shorter than the time $T_{min}$ of the display set following the display set of interest, reproduction of the display set following the display set of interest is not in time for display thereof.

Also, in a case where the available time T of the display set immediately before the display set of interest becomes short, and thus, the available time T thereof becomes shorter than the time $T_{min}$ of the display set immediately before the display set of interest, reproduction of the display set immediately before the display set of interest is not in time for display thereof.

Therefore, in a case where the display start time of the display set of interest is delayed, and thus, the available time T of the display set following the display set of interest becomes shorter than the time $T_{min}$ thereof, and in a case where the display start time of the display set immediately before the display set of interest is moved up, and thus, the available time T of the display set immediately before the display set of interest becomes shorter than the time $T_{min}$ thereof, the error processing unit 54 performs another error processing.

Specifically, the error processing unit 54 performs processing for making the time $T_{min}$ of the display set of interest shorter as error processing.

Here, for example, the error processing unit 54 causes the subtitle encoder 51 to change an encode parameter to make the size of the encoded data of the display set of interest to be obtained at the subtitle encoder 51 shorter, thereby making the time $T_{min}$ of the display set of interest shorter.

Specifically, the error processing unit 54 supplies a control signal for instructing to reduce the number of colors of the image data of a subtitle serving as an encoded target, or to reduce (thin out) the size (number of pixels) of the image data thereof, or the like, to the subtitle encoder 51.

In a case where the control signal is supplied from the error processing unit 54, the subtitle encoder 51 performs processing for reducing the number of colors of the image data of a subtitle serving as an encoded target, or reducing the size of the image data thereof, in accordance with the control signal thereof, and performs re-encoding for converting the image data of a subtitle after the processing thereof into encoded data. Subsequently, the subtitle encoder 51 employs the encoded data obtained as a result of the re-encoding to regenerate a display set of interest, and supplies this to the determining unit 52.

As described above, the determining unit 52 obtains the time $T_{min}$ of the display set of interest from the size s of the encoded data included in the display set of interest in accordance with the function F(s) (FIG. 20) serving as size-time relationship stored in the size-time relationship database 53.

In this case, the encoded data included in the display set of interest is data obtained by encoding the image data of a subtitle of which the number of colors and the size are small, so the size s thereof becomes small, and accordingly, the time $T_{min}$ obtained from the size s thereof in accordance with the size-time relationship also becomes short.

Metadata (additional information) is supplied to the metadata processing unit 61. The metadata processing unit 61 subjects the metadata supplied thereto to predetermined processing, and supplies this to the data synthesizing unit 64.

Moving picture data is supplied to the image processing unit 62. The image processing unit 62 subjects the moving picture data supplied thereto to predetermined processing, and supplies this to the data synthesizing unit 64.

Audio data (e.g., audio data accompanied with moving picture data) is supplied to the audio processing unit 63. The audio processing unit 63 subjects the audio data supplied thereto to predetermined processing, and supplies this to the data synthesizing unit 64.

The data synthesizing unit 64 synthesizes (multiplexes) the metadata from the metadata processing unit 61, the moving picture data from the image processing unit 62, the audio data from the audio processing unit 63, and the display set serving as the subtitle data from (the determining unit 52 of) the subtitle processing unit 50, generates a new-format file in which the stream obtained as a result of the synthesis thereof is stored, and outputs this.

Note that the display start time of a display set stored in the subtitle display time database 40 is included in the metadata, but this display start time is stored in the new-format file in a form such as the time-to-sample atom (FIG. 2A) or the like of the ISO base media file format by the data synthesizing unit 64.

Also, in a case where the time adjustment of the display start time of a display set is performed by the error processing performed at the error processing unit 54, the display start time after the time adjustment thereof is stored in the new-format tile.

Figure 22:
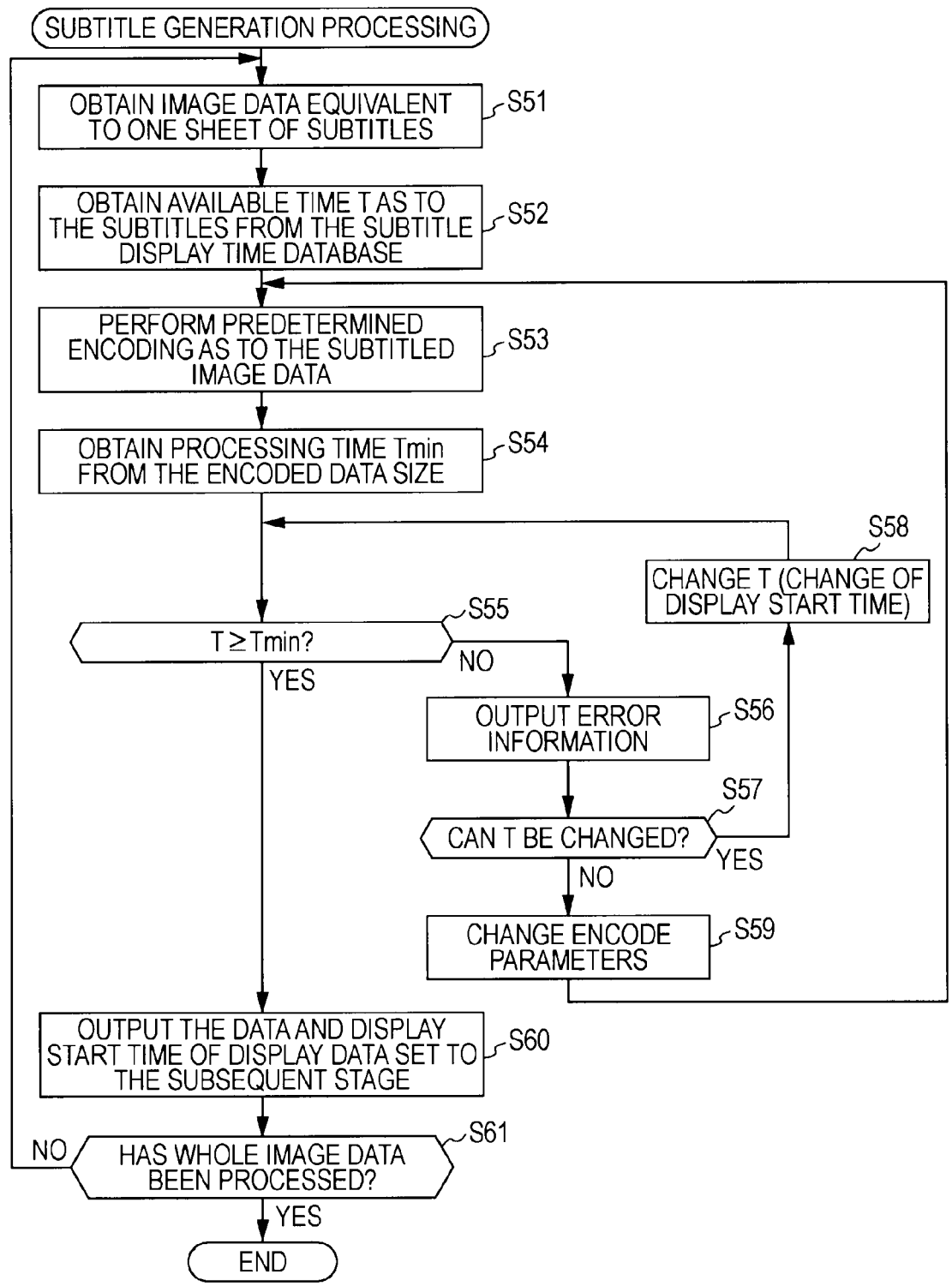
FIG. 22 is a flowchart describing subtitle generation processing.

Next, description will be made regarding processing to be performed at the subtitle processing unit 50 of the generating device in FIG. 21 (subtitle generation processing), with reference to FIG. 22.

With the subtitle processing unit 50, the subtitle encoder 51 waits for, for example, one sheet (screen worth) of bitmap data serving as the image data of a subtitle being supplied, and in step S51 obtains (receives) the image data of the subtitle thereof, and the processing proceeds to step S52.

In step S52, the subtitle encoder 51 obtains the available time T of the display set of interest by referencing the display start time of a subtitle (display set) stored in the subtitle display time database 40. Subsequently, the subtitle encoder 51 supplies the available time T of the display set of interest to the determining unit 52 along with the display start time thereof, and the processing proceeds to step S53 from step S52.

In step S53, the subtitle encoder 51 encodes the image data of the subtitle obtained in the last step S51, thereby generating encoded data (encoded_data_string( ) (FIG. 14)). Further, the subtitle encoder 51 employs the encoded data thereof to generate a display set serving as a subtitle sample, supplies this to the determining unit 52 as a display set of interest, and the processing proceeds to step S54 from step S53.

In step S54, the determining unit 52 detects the size s of the encoded data included in the display set of interest from the subtitle encoder 51. Further, the determining unit 52 obtains the time $T_{min}$ of the display set of interest from the size s of the encoded data included in the display set of interest in accordance with the size-time relationship (FIG. 20) stored in the size-time relationship database 53.

Subsequently, the processing proceeds to step S55 from step S54, and the determining unit 52 determines whether or not the available time T of the display set of interest is at or above the time $T_{min}$ of the display set of interest.

In a case where determination is made in step S55 that the available time T of the display set of interest is below the time $T_{min}$ of the display set of interest, i.e., in a case where reproduction of the display set of interest is not in time for display thereof, the processing proceeds to step S56, where the determining unit 52 outputs error information, and the processing proceeds to step S57.

In step S57, the error processing unit 54 performs time adjustment for delaying the display start time of the display set of interest, or accelerating the display start time of the display set immediately before the display set of interest, thereby determining whether to change (increase) the available time of the display set of interest.

In a case where the time adjustment is performed, thereby increasing the available time T of the display set of interest, as described in FIG. 20, the available time T of the display set following the display set of interest becomes short, and thus, the available time T thereof becomes shorter than the time $T_{min}$ of the display set following the display set of interest, and reproduction of the display set following the display set of interest is not in time for display thereof, or the available time T of the display set immediately before the display set of interest becomes short, and thus, the available time T thereof becomes shorter than the time $T_{min}$ of the display set immediately before the display set of interest, and reproduction of the display set immediately before the display set of interest is not in time for display thereof.

In step S57, such as described above, in a case where a situation is caused wherein reproduction of a display set is not in time for display thereof, the time adjustment is performed, and thus, determination is made that it is difficult to increase the available time T of the display set of interest. On the other hand, such as described above, in a case where a situation is not caused wherein reproduction of a display set is not in time for display thereof, in step S57, the time adjustment is performed, and thus, determination is made that it is possible to increase the available time T of the display set of interest.

In a case where determination is made in step S57 that it is possible to increase the available time T of the display set of interest, the processing proceeds to step S58, where the error processing unit 54 supplies a time adjustment control signal for instructing to delay the display start time of the display set of interest, or to move up the display start time of the display set immediately before the display set of interest, to the subtitle encoder 51.

In a case where the time adjustment control signal is supplied from the error processing unit 54, in accordance with the control signal thereof, the subtitle encoder 51 performs the time adjustment to delay the display start time of the display set of interest, or to move up the display start time of the display set immediately before the display set of interest. Further, the subtitle encoder 51 employs the display start time after the time adjustment to obtain the available time T of the display set of interest again, and supplies this to the determining unit 52. Note that, in a case where a time adjustment target is the display start time of the display set of interest, the subtitle encoder 51 also supplies the display start time after the time adjustment of the display set of interest to the determining unit 52.

Subsequently, the processing returns to step S55 from step S58, and hereafter, the same processing is repeated.

Also, in a case where determination is made in step S57 that the time adjustment is performed, thereby determining that it is difficult to increase the available time T of the display set of interest, the processing proceeds to step S59, where the error processing unit 54 supplies a control signal for changing an encoding parameter which instructs to reduce the number of colors of the image data of a subtitle to be encoded, or to reduce the size of the image data thereof, or the like, to the subtitle encoder 51.

In a case where the control signal for changing an encoding parameter is supplied from the error processing unit 54, the subtitle encoder 51 performs processing for reducing the number of colors of the image data of a subtitle to be encoded last time, or for reducing the size of the image data thereof (reduced sizing processing), in accordance with the control signal thereof. Subsequently, the processing returns to step S53 from step S59, where the subtitle encoder 51 encodes the image data of the subtitle after the reduced sizing processing, and hereafter, the same processing is repeated.

On the other hand, in a case where determination is made in step S55 that the available time T of the display set of interest is at or above the time $T_{min}$ of the display set of interest, i.e., in a case where reproduction of the display set of interest is in time for display thereof, the processing proceeds to step S60, where the determining unit 52 supplies the display set of interest, and the display start time of the display set of interest (in a case where the time adjustment is performed, the display start time after the time adjustment) to the data synthesizing unit 64, and the processing proceeds to step S61.

With the synthesizing unit 64, such as described above, the display start time of the display set of interest supplied from the determining unit 52 is stored in the new-format file in a form, for example, such as the time-to-sample atom (FIG. 2A) or the like of the ISO base media file format.

In step S61, the subtitle processing unit 50 determines whether or not all of the image data of subtitles to be stored in the new-format file have been processed.

In a case where determination is made in step S61 that there is the image data of an unprocessed subtitle of the image data of subtitles to be stored in the new-format file, the processing returns to step S51, and hereafter, the same processing is repeated.

Also, in a case where determination is made in step S61 that all of the image data of subtitles to be stored in the new-format file have been processed, the subtitle generation processing ends.

Such as described above, when the available time T of the display set of interest is shorter than the time $T_{min}$ of the display set of interest, the determining unit 52 determines that reproduction of the display set of interest is not in time for display of the display set of interest, and outputs error information, whereby a file wherein reproduction of a display set is not in time for display of the display set can be prevented from being generated, and consequently, the reproducing device can perform reproduction of a subtitle from the file so as to be in time for display of the subtitle thereof.

Specifically, with the reproducing device in FIG. 16, as described above, display sets are reproduced in order at the subtitle decode system 30 assuming that the display start time of (the subtitle of) a certain display set is taken as the decode start time of the display set to be displayed next.

On the other hand, the generating device in FIG. 21 assures that the time from the display start time of a certain display set until the display start time of the display set to be displayed next (the available time T of the display set to be displayed next) is at or above the time $T_{min}$ of the display set thereof.

Accordingly, with the reproducing device in FIG. 16, reproduction of a display set can be performed so as to be in time for display thereof.

With the present embodiment, in a case where the available time T of a display set is below the time $T_{min}$, the number of colors and size of the image data of a subtitle is reduced, the size s of encoded data, and consequently, the time $T_{min}$ is reduced. However, reducing the number of colors and size of the image data of a subtitle leads to modification of the content of a file (content), processing for reducing the number of colors and size of the image data of a subtitle to reduce the time $T_{min}$ can be performed after a user's (file creator's) confirmation is made. Alternatively, with the generating device, error processing such as reducing the number of colors and size of the image data of a subtitle to reduce the time $T_{min}$ is not performed, error information, i.e., to the effect that reproduction of a subtitle is not in time for display thereof is informed to the user, and the subsequent countermeasures can be performed by waiting for instructions from the user.

Error processing for performing the time adjustment of display start time to increase the available time T is the same as the above.

Note that in a case where error processing is not performed, the subtitle processing unit 50 (FIG. 21) can be configured without providing the error processing unit 54. Also, in order to reduce the size s of encoded data, and consequently, the time $T_{min}$, there is a method other than reducing the number of colors and size of the image data of a subtitle, wherein the image data of multiple subtitles (multiple sheets of image data) is synthesized to obtain a sheet of image data (the image data of one subtitle).

Next, the above-mentioned series of processing can be performed by hardware or software. In a case where the series of processing is performed by software, a program making up the software is installed in a general-purpose computer or the like.

Figure 23:
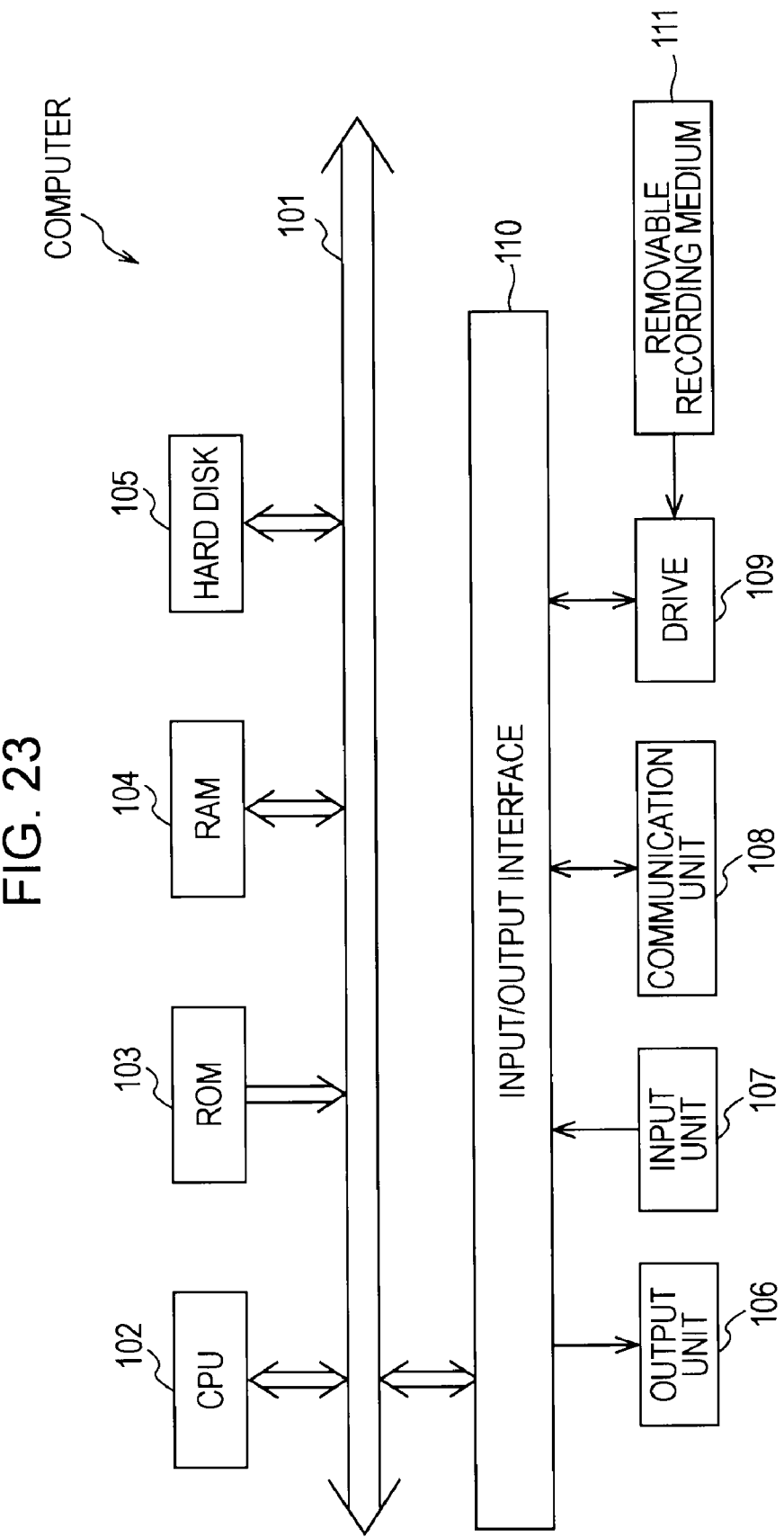
FIG. 23 is a block diagram illustrating a configuration example of a computer according to an embodiment.

FIG. 23 illustrates a configuration example of a computer according to an embodiment in which a program which executes the above-mentioned series of processing is installed.

The program can be recorded in a hard disk 105 or ROM 103 serving as a recording medium internally included in the computer beforehand. Alternatively, the program can be temporarily or permanently stored (recorded) in a removable recording medium 111 such as a flexible disk, CD-ROM (Compact Disc Read Only Memory), MO (Magneto-Optical) disk, DVD (Digital Versatile Disc), magnetic disk, semiconductor memory, or the like. Such a removable recording medium 111 can be provided as so-called package software.

Note that, in addition to the above-mentioned arrangement wherein the program is installed into the computer from the removable medium 111, an arrangement may be available wherein the program is transferred to the computer from a download site through an artificial satellite wirelessly, or the program is transferred to the computer through a network such as the Internet by cable, and the computer receives the program thus transferred at a communication unit 108, and installs this into a built-in hard disk 105.

The computer includes a CPU (Central Processing Unit) 102 internally. An input/output interface 110 is connected to the CPU 102 through a bus 101, and upon a command being input by the user operating an input unit 107 made up a keyboard, mouse, microphone, and so forth, the CPU 102 executes the program stored in the ROM (Read Only Memory) 103 in accordance with the command thereof via the input/output interface 110. Alternatively, the CPU 102 loads the program stored in the hard disk 105, the program transferred from a satellite or network and received at the communication unit 108 and installed in the hard disk 105, or the program read out form the removable recording medium 111 mounted on a drive 109 and installed into the hard disk 105, to RAM (Read Access Memory) 104 and executes this. Thus, the CPU 102 performs the processing in accordance with the above-mentioned flowchart, or the processing preformed by the configuration of the above-mentioned block diagram. Subsequently, the CPU 102 outputs the processing results thereof from an output unit 106 made up of an LCD (Liquid Crystal Display), speaker, and so forth through the input/output interface 110, or transmits these from the communication unit 108, and further, records these in the hard disk 105.

Now, with the present Specification, processing steps describing the program causing the computer to perform various types of processing do not have to be processed in time-sequence in accordance with the order described as the flow-chart, and may include processing executed in parallel or individually (e.g., parallel processing or object-oriented processing).

Also, the program may be processed by a single computer, or may be processed by multiple computers in a distributed manner. Further, the program may be transferred to a remote computer and executed there.

Note that the embodiments of the present invention are not restricted to the above-mentioned embodiment, and various modifications can be performed without departing from the essence of the present invention.

The present application contains subject matter related to that disclosed in Japanese Priority Patent Application JP 2008-151695 filed in the Japan Patent Office on Jun. 10, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A generating device comprising:
  subtitle encode means configured to generate, of a stream including moving picture data relating to a moving picture, and subtitle data relating to a subtitle displayed over the whole display section of said moving picture, said subtitle data by encoding the image data of said subtitle; and
  determining means configured to determine whether or not reproduction of said subtitle is in time for display of said subtitle based on the size of the encoded data obtained by encoding the image data of said subtitle;
  wherein, with a section where display of said subtitle is constant as the display units of said subtitle, said subtitle data is classified into a display set which is said subtitle data in said display units;
  and wherein, in a case where the time between display start time when display of a subtitle to be displayed immediately before the subtitle of a display set of interest which is a display set to which attention is paid, and said display start time of the subtitle of said display set of interest is taken as available time which can be employed for reproduction of said display set of interest, and also the time used for reproduction of said display set of interest is taken as processing time, said determining means obtain processing time regarding said display set of interest from the size of the encoded data of said display set of interest in accordance with size-time relationship which is relationship obtained beforehand between the size of said encoded data and said processing time, and determine that reproduction of the subtitle of said display set of interest is not in time for display of the subtitle thereof when the available time regarding said display set of interest is below the processing time regarding said display set of interest, to output error information representing an error.

2. The generating device according to claim 1, further comprising:
  error processing means configured to perform error processing which is processing which increases the available time regarding said display set of interest in accordance with the output of said error information by said determining means, or processing which decreases the processing time regarding said display set of interest.

3. The generating device according to claim 2, wherein said error processing means increase the available time regarding said display set of interest by delaying said display start time of the subtitle of said display set of interest, or by accelerating said display start time of the subtitle to be displayed immediately before the subtitle of said display set of interest.

4. The generating device according to claim 2, wherein said error processing means change an encode parameter by said subtitle encode means to decrease the size of the encoded data of said display set of interest, thereby decreasing the processing time regarding said display set of interest.

5. The generating device according to claim 1, wherein said display set includes number-of-subtitles information representing the number of said subtitles to be displayed, and transparency information representing the transparency of said subtitles;
  and wherein a display set during a non-display section which hides said subtitle includes said number-of-subtitles information representing that the number of said subtitles is 0, or said transparency information representing that said subtitle is completely transparent;
  and wherein, in a case where the display set of a subtitle to be displayed immediately before the subtitle of said display set of interest is the display set during said non-display section, the time between said display start time of subtitle to be displayed further immediately before the subtitle to be displayed immediately before the subtitle of said display set of interest, and said display start time of the subtitle of said display set of interest is taken as the available time regarding said display set of interest.

6. The generating device according to claim 1, wherein said moving picture data is data of which the format conforming to the MP4 file format, or ISO base media file format.

7. A generating method comprising:
generating, by a generating device, a stream including moving picture data relating to a moving picture, and subtitle data relating to a subtitle to be displayed over the whole display section of said moving picture;
generating said subtitle data by encoding the image data of said subtitle; and
determining whether or not reproduction of said subtitle is in time for display of said subtitle based on the size of encoded data obtained by encoding the image data of said subtitle;
wherein, with a section where display of said subtitle is constant as the display units of said subtitle, said subtitle data is classified into a display set which is said subtitle data in said display units;
and wherein, in a case where the time between display start time when display of a subtitle to be displayed immediately before the subtitle of a display set of interest which is a display set to which attention is paid, and said display start time of the subtitle of said display set of interest is taken as available time which can be employed for reproduction of said display set of interest, and also the time used for reproduction of said display set of interest is taken as processing time, the processing time regarding said display set of interest is obtained from the size of the encoded data of said display set of interest in accordance with size-time relationship which is relationship obtained beforehand between the size of said encoded data and said processing time, determination is made that reproduction of the subtitle of said display set of interest is not in time for display of the subtitle thereof when the available time regarding said display set of interest is below the processing time regarding said display set of interest, and error information representing an error is output.

8. A non-transitory computer-readable medium including a program, which when executed by a computer, causes the computer to function as a generating device comprising:
subtitle encode means configured to generate, of a stream including moving picture data relating to a moving picture, and subtitle data relating to a subtitle displayed over the whole display section of said moving picture, said subtitle data by encoding the image data of said subtitle; and
determining means configured to determine whether or not reproduction of said subtitle is in time for display of said subtitle based on the size of the encoded data obtained by encoding the image data of said subtitle;
wherein, with a section where display of said subtitle is constant as the display units of said subtitle, said subtitle data is classified into a display set which is said subtitle data in said display units;
and wherein, in a case where the time between display start time when display of a subtitle to be displayed immediately before the subtitle of a display set of interest which is a display set to which attention is paid, and said display start time of the subtitle of said display set of interest is taken as available time which can be employed for reproduction of said display set of interest, and also the time used for reproduction of said display set of interest is taken as processing time, said determining means obtain processing time regarding said display set of interest from the size of the encoded data of said display set of interest in accordance with size-time relationship which is relationship obtained beforehand between the size of said encoded data and said processing time, and determine that reproduction of the subtitle of said display set of interest is not in time for display of the subtitle thereof when the available time regarding said display set of interest is below the processing time regarding said display set of interest, to output error information representing an error.

9. A generating device comprising:
a subtitle encode unit configured to generate, of a stream including moving picture data relating to a moving picture, and subtitle data relating to a subtitle displayed over the whole display section of said moving picture, said subtitle data by encoding the image data of said subtitle; and
a determining unit configured to determine whether or not reproduction of said subtitle is in time for display of said subtitle based on the size of the encoded data obtained by encoding the image data of said subtitle;
wherein, with a section where display of said subtitle is constant as the display units of said subtitle, said subtitle data is classified into a display set which is said subtitle data in said display units;
and wherein, in a case where the time between display start time when display of a subtitle to be displayed immediately before the subtitle of a display set of interest which is a display set to which attention is paid, and said display start time of the subtitle of said display set of interest is taken as available time which can be employed for reproduction of said display set of interest, and also the time used for reproduction of said display set of interest is taken as processing time, said determining unit obtains processing time regarding said display set of interest from the size of the encoded data of said display set of interest in accordance with size-time relationship which is relationship obtained beforehand between the size of said encoded data and said processing time, and determines that reproduction of the subtitle of said display set of interest is not time for display of the subtitle thereof when the available time regarding said display set of interest is below the processing time regarding said display set of interest, to output error information representing an error.

10. A non-transitory computer-readable medium including a program, which when executed by a computer, causes the computer to function as a generating device comprising:
a subtitle encode unit configured to generate, of a stream including moving picture data relating to a moving picture, and subtitle data relating to a subtitle displayed over the whole display section of said moving picture, said subtitle data by encoding the image data of said subtitle; and
a determining unit configured to determine whether or not reproduction of said subtitle is in time for display of said subtitle based on the size of the encoded data obtained by encoding the image data of said subtitle;
wherein, with a section where display of said subtitle is constant as the display units of said subtitle, said subtitle data is classified into a display set which is said subtitle data in said display units;
and wherein, in a case where the time between display start time when display of a subtitle to be displayed immediately before the subtitle of a display set of interest which is a display set to which attention is paid, and said display start time of the subtitle of said display set of interest is taken as available time which can be employed for reproduction of said display set of interest, and also the time used for reproduction of said display set of interest is taken as processing time, said determining unit obtains processing time regarding said display set of interest from the size of the encoded data of said display set of interest in accordance with size-time relationship which is relationship obtained beforehand between the size of said encoded data and said processing time, and determines that reproduction of the subtitle of said display set of interest does is not in time for display of the subtitle thereof when the available time regarding said display set of interest is below the processing time regarding said display set of interest, to output error information representing an error.

* * * * *